US011076358B2

(12) United States Patent
Yang et al.

(10) Patent No.: US 11,076,358 B2
(45) Date of Patent: Jul. 27, 2021

(54) TEMPORARY POWER ADJUSTMENT INDICATION FOR UPLINK TRANSMISSIONS

(71) Applicant: QUALCOMM Incorporated, San Diego, CA (US)

(72) Inventors: Wei Yang, San Diego, CA (US); Chih-Ping Li, San Diego, CA (US); Seyedkianoush Hosseini, San Diego, CA (US); Jing Jiang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/544,456

(22) Filed: Aug. 19, 2019

(65) Prior Publication Data

US 2020/0068495 A1 Feb. 27, 2020

Related U.S. Application Data

(60) Provisional application No. 62/720,832, filed on Aug. 21, 2018.

(51) Int. Cl.
*H04W 52/14* (2009.01)
*H04W 52/32* (2009.01)
(Continued)

(52) U.S. Cl.
CPC ....... *H04W 52/146* (2013.01); *H04W 52/241* (2013.01); *H04W 52/325* (2013.01); *H04W 72/0473* (2013.01)

(58) Field of Classification Search
CPC ............. H04W 52/146; H04W 52/241; H04W 52/243; H04W 52/247; H04W 52/325;
(Continued)

(56) References Cited

U.S. PATENT DOCUMENTS

2012/0170545 A1* 7/2012 Yamamoto .......... H04W 56/002
370/330
2013/0114577 A1* 5/2013 Cai ....................... H04L 5/0053
370/336
(Continued)

FOREIGN PATENT DOCUMENTS

WO WO-2018118343 A1 6/2018

OTHER PUBLICATIONS

Huawei et al., "Discussion on UL Multiplexing of Grant-Based eMBB and Grant-Free URLLC", 3GPP Draft, 3GPP TSG RAN WG1 Meeting #90, R1-1712218, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051315035, 6 Pages, Retrieved from the Internet: URL:http://www.3gpp.org/ftp/Meetings_3GPP_SYNC/RAN1/Docs [retrieved on Aug. 20, 2017] section 2.2.
(Continued)

*Primary Examiner* — Tan H Trinh
(74) *Attorney, Agent, or Firm* — Holland & Hart LLP

(57) ABSTRACT

Methods, systems, and devices for wireless communications are described. A base station may identify one or more first user equipments (UEs) that have been configured for grant-free transmissions on an allocation of resources. In some cases, the base station may then schedule an uplink transmission for a second UE on resources that overlap the allocation of resources. Accordingly, the base station may transmit a power adjustment indication (PAI) to the one or more first UEs to adjust a transmit power for uplink transmissions on the overlapping resources. In some cases, the PAI may include an indication of frequency-domain resources for the power adjustment indicated in the PAI, a specified time duration for the power adjustment indicated in the PAI, an indication of specific uplink transmissions to
(Continued)

which the transmit power adjustment is to be applied, or a combination thereof.

23 Claims, 19 Drawing Sheets

(51) Int. Cl.
*H04W 52/24* (2009.01)
*H04W 72/04* (2009.01)

(58) Field of Classification Search
CPC ......... H04W 72/0473; H04W 72/1289; H04W 72/14
USPC .................. 455/69, 522; 370/329, 330, 336
See application file for complete search history.

(56) References Cited

U.S. PATENT DOCUMENTS

| | | | | |
|---|---|---|---|---|
| 2015/0181546 | A1* | 6/2015 | Freda | H04L 27/0014 370/336 |
| 2015/0215944 | A1* | 7/2015 | Kim | H04L 5/001 370/329 |
| 2015/0365973 | A1* | 12/2015 | Choi | H04W 74/006 370/336 |
| 2017/0318541 | A1* | 11/2017 | Islam | H04B 7/0617 |
| 2017/0359835 | A1* | 12/2017 | Seo | H04W 72/14 |
| 2018/0132245 | A1* | 5/2018 | Yerramalli | H04W 72/042 |
| 2018/0139701 | A1* | 5/2018 | Wang | H04W 52/367 |
| 2018/0176892 | A1* | 6/2018 | Kim | H04W 52/386 |
| 2019/0215823 | A1* | 7/2019 | Kim | H04L 1/1861 |
| 2019/0223204 | A1* | 7/2019 | Kim | H04B 1/00 |
| 2019/0306801 | A1* | 10/2019 | Zhou | H04W 52/04 |
| 2019/0313279 | A1* | 10/2019 | Li | H04W 28/0289 |
| 2020/0145079 | A1* | 5/2020 | Marinier | H04B 7/0456 |
| 2020/0389886 | A1* | 12/2020 | Lee | H04L 5/005 |

OTHER PUBLICATIONS

Huawei et al., "UL Inter-UE Transmission Prioritization and Multiplexing",3GPP Draft, 3GPP TSG RAN WG1 Meeting #94, R1-1808099, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, aug. 20, 2018-Aug. 24, 2018, Aug. 11, 2018 (Aug. 11, 2018), XP051515501, 4 Pages, Retrieved from the Internet: URL:http://www.3gpp.org/ftp/tsg%5Fran/WG1%5FRL1/TSGR1%5F94/Docs/R1%201808099%2Ezip [retrieved on Aug. 11, 2018] section 3.

Interdigital Inc: "On eMBB and URLLC Multiplexing in UL", 3GPP Draft, 3GPP TSG RAN WG1 Meeting #92, R1-1802627 on eMBB and URLLC Multiplexing in UL, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398065, 5 Pages, Retrieved from the Internet: URL:http://www.3gpp.org/ftp/tsg%5Fran/WG1%5FRL1/TSGR1%5F92/Docs/ [retrieved on Feb. 17, 2018] section 2.

International Search Report and Written Opinion—PCT/US2019/047297—ISA/EPO—dated Oct. 30, 2019.

* cited by examiner

TEMPORARY POWER ADJUSTMENT INDICATION FOR UPLINK TRANSMISSIONS

CROSS REFERENCE

The present application for patent claims the benefit of U.S. Provisional Patent Application No. 62/720,832 by Yang et al., entitled "TEMPORARY POWER ADJUSTMENT INDICATION FOR UPLINK TRANSMISSIONS," filed Aug. 21, 2018, assigned to the assignee hereof, and expressly incorporated by reference in its entirety herein.

BACKGROUND

The following relates generally to wireless communications, and more specifically to temporary power adjustment indication (PAI) for uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, different services may support different reliability and latency requirements, as well as different transmission schemes. For example, both grant-based and grant-free transmissions may be supported, where the grant-based transmissions may be dynamically scheduled through uplink grants and the grant-free transmissions may be indicated on allocated resources through configured grants for one or more UEs. In some cases, a base station may schedule a grant-based transmission on one or more of the allocated resources for the grant-free transmissions. As such, interference or conflicts may occur between the transmissions on the same resources. Efficient techniques are desired for accommodating transmissions on the same resources to ensure both are transmitted and received successfully.

SUMMARY

The described techniques relate to improved methods, systems, devices, and apparatuses that support temporary power adjustment indication (PAI) for uplink transmissions. Generally, the described techniques provide for a base station identifying one or more first user equipments (UEs) that have been configured for grant-free transmissions on an allocation of resources, scheduling an uplink transmission for a second UE on resources that overlap the allocation of resources, and transmitting a PAI to the one or more first UEs to adjust a transmit power for uplink transmissions on the overlapping resources. In some cases, the PAI may include an indication of frequency-domain resources for the power adjustment indicated in the PAI, a specified time duration for the power adjustment indicated in the PAI, an indication of specific uplink transmissions to which the transmit power adjustment is to be applied, or a combination thereof. The base station may transmit the PAI in a broadcast message, a multicast message (e.g., a group-common transmission), or a dynamic downlink control information (DCI) message. One of the first UEs may receive the PAI and may accordingly adjust the transmit power for one or more uplink transmissions within the specified time duration. Additionally, one of the first UEs may be configured to monitor for the PAI and receive the PAI based on the monitoring configuration. In some cases, the UE may monitor for the PAI according to a periodicity based on a periodicity for transmitting the grant-free transmissions.

A method of wireless communication at a UE is described. The method may include receiving a grant for uplink transmissions to a base station on a first set of allocated resources, receiving a transmit power adjustment indication, indicating that the UE is to adjust a transmit power of uplink transmissions on a second set of allocated resources for a specified time duration, comparing the first set of resources and the second set of resources, and adjusting the transmit power of uplink transmissions on the second set of allocated resources during the specified time duration based on the comparing.

An apparatus for wireless communication at a UE is described. The apparatus may include a processor, memory coupled with the processor, and instructions stored in the memory. The instructions may be executable by the processor to cause the apparatus to receive a grant for uplink transmissions to a base station on a first set of allocated resources, receive a transmit power adjustment indication, indicating that the UE is to adjust a transmit power of uplink transmissions on a second set of allocated resources for a specified time duration, compare the first set of resources and the second set of resources, and adjust the transmit power of uplink transmissions on the second set of allocated resources during the specified time duration based on the comparing.

Another apparatus for wireless communication at a UE is described. The apparatus may include means for receiving a grant for uplink transmissions to a base station on a first set of allocated resources, receiving a transmit power adjustment indication, indicating that the UE is to adjust a transmit power of uplink transmissions on a second set of allocated resources for a specified time duration, comparing the first set of resources and the second set of resources, and adjusting the transmit power of uplink transmissions on the second set of allocated resources during the specified time duration based on the comparing.

A non-transitory computer-readable medium storing code for wireless communication at a UE is described. The code may include instructions executable by a processor to receive a grant for uplink transmissions to a base station on a first set of allocated resources, receive a transmit power adjustment indication, indicating that the UE is to adjust a transmit power of uplink transmissions on a second set of allocated resources for a specified time duration, compare the first set of resources and the second set of resources, and adjust the transmit power of uplink transmissions on the second set of allocated resources during the specified time duration based on the comparing.

A method of wireless communication at a UE is described. The method may include receiving a grant for autonomous uplink transmissions to a base station on a set of allocated resources, receiving a transmit PAI, indicating that the UE is to adjust a transmit power of uplink transmissions on the set of allocated resources for a specified time duration, and adjusting the transmit power of uplink transmissions on the set of allocated resources during the specified time duration in accordance with the transmit PAI.

An apparatus for wireless communication at a UE is described. The apparatus may include a processor, memory coupled with the processor, and instructions stored in the memory. The instructions may be executable by the processor to cause the apparatus to receive a grant for autonomous uplink transmissions to a base station on a set of allocated resources, receive a transmit PAI, indicating that the UE is to adjust a transmit power of uplink transmissions on the set of allocated resources for a specified time duration, and adjust the transmit power of uplink transmissions on the set of allocated resources during the specified time duration in accordance with the transmit PAI.

Another apparatus for wireless communication at a UE is described. The apparatus may include means for receiving a grant for autonomous uplink transmissions to a base station on a set of allocated resources, receiving a transmit PAI, indicating that the UE is to adjust a transmit power of uplink transmissions on the set of allocated resources for a specified time duration, and adjusting the transmit power of uplink transmissions on the set of allocated resources during the specified time duration in accordance with the transmit PAI.

A non-transitory computer-readable medium storing code for wireless communication at a UE is described. The code may include instructions executable by a processor to receive a grant for autonomous uplink transmissions to a base station on a set of allocated resources, receive a transmit PAI, indicating that the UE is to adjust a transmit power of uplink transmissions on the set of allocated resources for a specified time duration, and adjust the transmit power of uplink transmissions on the set of allocated resources during the specified time duration in accordance with the transmit PAI.

Some examples of the method, apparatuses, and non-transitory computer-readable medium described herein may further include operations, features, means, or instructions for receiving, with the transmit PAI, an indication of frequency-domain resources to which the transmit power adjustment may be to be applied.

Some examples of the method, apparatuses, and non-transitory computer-readable medium described herein may further include operations, features, means, or instructions for receiving, with the transmit PAI, an indication of the specified time duration during which the transmit power adjustment may be to be applied.

Some examples of the method, apparatuses, and non-transitory computer-readable medium described herein may further include operations, features, means, or instructions for determining the specified time duration based on a configuration previously received at the UE.

In some examples of the method, apparatuses, and non-transitory computer-readable medium described herein, receiving the grant further may include operations, features, means, or instructions for receiving the grant for autonomous uplink transmissions to the base station for the first set of allocated resources.

Some examples of the method, apparatuses, and non-transitory computer-readable medium described herein may further include operations, features, means, or instructions for receiving, with the transmit PAI, an indication of specific uplink transmissions to which the transmit power adjustment may be to be applied.

In some examples of the method, apparatuses, and non-transitory computer-readable medium described herein, receiving the transmit PAI may include operations, features, means, or instructions for receiving the transmit PAI in a dynamic DCI message.

In some examples of the method, apparatuses, and non-transitory computer-readable medium described herein, adjusting the transmit power of uplink transmissions on the set of allocated resources may include operations, features, means, or instructions for increasing the transmit power of uplink transmissions on the set of allocated resources by a number of decibels specified by the transmit PAI.

In some examples of the method, apparatuses, and non-transitory computer-readable medium described herein, adjusting the transmit power of uplink transmissions on the set of allocated resources may include operations, features, means, or instructions for decreasing the transmit power of uplink transmissions on the set of allocated resources by a number of decibels specified by the transmit PAI.

In some examples of the method, apparatuses, and non-transitory computer-readable medium described herein, adjusting the transmit power of uplink transmissions on the set of allocated resources may include operations, features, means, or instructions for adjusting the transmit power of uplink transmissions on the set of allocated resources during a particular slot identified by the base station.

Some examples of the method, apparatuses, and non-transitory computer-readable medium described herein may further include operations, features, means, or instructions for receiving an indication of the particular slot with receipt of the transmit PAI.

Some examples of the method, apparatuses, and non-transitory computer-readable medium described herein may further include operations, features, means, or instructions for receiving an indication of the particular slot via a configuration message received before receipt of the transmit PAI.

In some examples of the method, apparatuses, and non-transitory computer-readable medium described herein, adjusting the transmit power of uplink transmissions on the set of allocated resources may include operations, features, means, or instructions for adjusting the transmit power of uplink transmissions on the set of allocated resources during a same slot in which the UE received the transmit PAI.

Some examples of the method, apparatuses, and non-transitory computer-readable medium described herein may further include operations, features, means, or instructions for receiving a configuration that indicates resources that the UE may be to monitor for receipt of the transmit PAI and monitoring the resources for a signal that includes the transmit PAI.

In some examples of the method, apparatuses, and non-transitory computer-readable medium described herein, receiving the transmit PAI may include operations, features, means, or instructions for receiving the transmit PAI via a broadcast downlink control information message that includes an indication of at least one of time or frequency resources to which the transmit power adjustment may be to be applied.

Some examples of the method, apparatuses, and non-transitory computer-readable medium described herein may further include operations, features, means, or instructions for comparing the at least one of time or frequency resources to which the transmit power adjustment may be to be applied with the set of allocated resources, where the uplink transmission whose transmit powers may be to be adjusted in accordance with the transmit PAI may be the uplink transmission within the set of allocated resources that overlap with the at least one of time or frequency resources to which the transmit power adjustment may be to be applied.

In some examples of the method, apparatuses, and non-transitory computer-readable medium described herein, receiving the transmit PAI may include operations, features, means, or instructions for receiving the transmit PAI via a multicast DCI message, where the multicast DCI message includes one or more UE-specific fields that each include a UE-specific transmit PAI.

In some examples of the method, apparatuses, and non-transitory computer-readable medium described herein, the UE-specific transmit PAI indicates that transmit power of the UE may be not to be adjusted.

Some examples of the method, apparatuses, and non-transitory computer-readable medium described herein may further include operations, features, means, or instructions for receiving a configuration indicating a field index of the UE-specific field in the multicast DCI message that pertains to the UE and a payload size or length of the multicast DCI message.

In some examples of the method, apparatuses, and non-transitory computer-readable medium described herein, receiving the transmit PAI via the multicast DCI message may include operations, features, means, or instructions for receiving the multicast DCI message via a same periodicity as that of the set of allocated resources for autonomous uplink transmissions.

In some examples of the method, apparatuses, and non-transitory computer-readable medium described herein, receiving the transmit PAI via the multicast DCI message may include operations, features, means, or instructions for receiving the multicast DCI message via a slot-based periodicity.

In some examples of the method, apparatuses, and non-transitory computer-readable medium described herein, the specified time duration may be either one slot or one period of the set of allocated resources.

A method of wireless communication at a base station is described. The method may include identifying that one or more first user equipment (UEs) have been allocated a first set of resources via a grant for uplink transmissions to the base station, scheduling an uplink transmission of a second UE to the base station, where the scheduled uplink transmission of the second UE at least partially overlaps the allocated first set of resources provided to the first UEs, and transmitting to the one or more first UEs a transmit power adjustment indication that the one or more first UEs are to adjust a transmit power of uplink transmissions on a second set of allocated resources for a specified time duration.

An apparatus for wireless communication at a base station is described. The apparatus may include a processor, memory coupled with the processor, and instructions stored in the memory. The instructions may be executable by the processor to cause the apparatus to identify that one or more first user equipment (UEs) have been allocated a first set of resources via a grant for uplink transmissions to the base station, schedule an uplink transmission of a second UE to the base station, where the scheduled uplink transmission of the second UE at least partially overlaps the allocated first set of resources provided to the first UEs, and transmit to the one or more first UEs a transmit power adjustment indication that the one or more first UEs are to adjust a transmit power of uplink transmissions on a second set of allocated resources for a specified time duration.

Another apparatus for wireless communication at a base station is described. The apparatus may include means for identifying that one or more first user equipment (UEs) have been allocated a first set of resources via a grant for uplink transmissions to the base station, scheduling an uplink transmission of a second UE to the base station, where the scheduled uplink transmission of the second UE at least partially overlaps the allocated first set of resources provided to the first UEs, and transmitting to the one or more first UEs a transmit power adjustment indication that the one or more first UEs are to adjust a transmit power of uplink transmissions on a second set of allocated resources for a specified time duration.

A non-transitory computer-readable medium storing code for wireless communication at a base station is described. The code may include instructions executable by a processor to identify that one or more first user equipment (UEs) have been allocated a first set of resources via a grant for uplink transmissions to the base station, schedule an uplink transmission of a second UE to the base station, where the scheduled uplink transmission of the second UE at least partially overlaps the allocated first set of resources provided to the first UEs, and transmit to the one or more first UEs a transmit power adjustment indication that the one or more first UEs are to adjust a transmit power of uplink transmissions on a second set of allocated resources for a specified time duration.

A method of wireless communication at a base station is described. The method may include identifying that one or more first UEs have been allocated resources via a grant for autonomous uplink transmissions to the base station, scheduling an uplink transmission of a second UE to the base station, where the scheduled uplink transmission of the second UE at least partially overlaps the allocated resources provided to the first UEs, and transmitting to the one or more first UEs a transmit PAI that the one or more first UEs are to adjust a transmit power of uplink transmissions on the allocated resources for a specified time duration.

An apparatus for wireless communication at a base station is described. The apparatus may include a processor, memory coupled with the processor, and instructions stored in the memory. The instructions may be executable by the processor to cause the apparatus to identify that one or more first UEs have been allocated resources via a grant for autonomous uplink transmissions to the base station, schedule an uplink transmission of a second UE to the base station, where the scheduled uplink transmission of the second UE at least partially overlaps the allocated resources provided to the first UEs, and transmit to the one or more first UEs a transmit PAI that the one or more first UEs are to adjust a transmit power of uplink transmissions on the allocated resources for a specified time duration.

Another apparatus for wireless communication at a base station is described. The apparatus may include means for identifying that one or more first UEs have been allocated resources via a grant for autonomous uplink transmissions to the base station, scheduling an uplink transmission of a second UE to the base station, where the scheduled uplink transmission of the second UE at least partially overlaps the allocated resources provided to the first UEs, and transmitting to the one or more first UEs a transmit PAI that the one or more first UEs are to adjust a transmit power of uplink transmissions on the allocated resources for a specified time duration.

A non-transitory computer-readable medium storing code for wireless communication at a base station is described. The code may include instructions executable by a processor to identify that one or more first UEs have been allocated resources via a grant for autonomous uplink transmissions to the base station, schedule an uplink transmission of a second UE to the base station, where the scheduled uplink transmission of the second UE at least partially overlaps the allocated resources provided to the first UEs, and transmit to the one or more first UEs a transmit PAI that the one or more first UEs are to adjust a transmit power of uplink transmissions on the allocated resources for a specified time duration.

Some examples of the method, apparatuses, and non-transitory computer-readable medium described herein may further include operations, features, means, or instructions for transmitting, with the transmit PAI, an indication of frequency-domain resources to which the transmit power adjustment may be to be applied.

Some examples of the method, apparatuses, and non-transitory computer-readable medium described herein may further include operations, features, means, or instructions for transmitting, with the transmit PAI, an indication of the specified time duration during which the transmit power adjustment may be to be applied.

Some examples of the method, apparatuses, and non-transitory computer-readable medium described herein may further include operations, features, means, or instructions for transmitting the specified time duration via a configuration message separate from transmission of the transmit PAI.

Some examples of the method, apparatuses, and non-transitory computer-readable medium described herein may further include operations, features, means, or instructions for transmitting, with the transmit PAI, an indication of specific uplink transmissions to which the transmit power adjustment may be to be applied.

In some examples of the method, apparatuses, and non-transitory computer-readable medium described herein, transmitting the transmit PAI may include operations, features, means, or instructions for including the transmit PAI in a dynamic DCI message.

In some examples of the method, apparatuses, and non-transitory computer-readable medium described herein, the transmit PAI includes a number of decibels by which the first UEs may be to increase the transmit power of uplink transmissions on the allocated resources.

In some examples of the method, apparatuses, and non-transitory computer-readable medium described herein, the transmit PAI includes a number of decibels by which the first UEs may be to decrease the transmit power of uplink transmissions on the allocated resources.

In some examples of the method, apparatuses, and non-transitory computer-readable medium described herein, the transmit PAI may be to be applied by the first UEs during a particular slot identified to the first UEs.

In some examples of the method, apparatuses, and non-transitory computer-readable medium described herein, the transmit PAI may be to be applied by the first UEs during a same slot in which the first UEs receive the transmit PAI.

In some examples of the method, apparatuses, and non-transitory computer-readable medium described herein, transmitting the transmit PAI may include operations, features, means, or instructions for broadcasting the transmit PAI and including in the broadcast an indication of at least one of time or frequency resources to which the transmit power adjustment may be to be applied.

In some examples of the method, apparatuses, and non-transitory computer-readable medium described herein, transmitting the transmit PAI may include operations, features, means, or instructions for multicasting the transmit PAI to at least some of the first UEs via a DCI message, where the DCI message includes one or more UE-specific fields that each include a UE-specific transmit PAI.

In some examples of the method, apparatuses, and non-transitory computer-readable medium described herein, at least one UE-specific transmit PAI indicates that transmit power may be not to be adjusted.

Some examples of the method, apparatuses, and non-transitory computer-readable medium described herein may further include operations, features, means, or instructions for configuring the at least some of the first UEs with a field index of the respective UE-specific fields in the DCI message and a payload size or length of the DCI message.

In some examples of the method, apparatuses, and non-transitory computer-readable medium described herein, multicasting the transmit PAI may include operations, features, means, or instructions for transmitting the DCI message using a same periodicity as that of the allocated resources.

In some examples of the method, apparatuses, and non-transitory computer-readable medium described herein, multicasting the transmit PAI may include operations, features, means, or instructions for transmitting the DCI message using a slot-based periodicity.

In some examples of the method, apparatuses, and non-transitory computer-readable medium described herein, the specified time duration may be either one slot or one period of the allocated resources.

DETAILED DESCRIPTION

In some wireless communications systems, communications for multiple user equipments (UEs) may be multiplexed together, where the multiple UEs may support different services with different reliability and latency requirements. Additionally, both grant-based and grant-free transmissions may be supported in the same wireless communications system. As such, when attempting to multiplex communications with different service types and different transmission schemes, one or more uplink communications may overlap on a set of time-frequency resources. For example, a base station may dynamically schedule traffic for multiple services on the same set of resources, which may cause interference or similarly affect the traffic for one service or another. In some cases, the base station may adjust the power of one or both transmissions to ensure both are transmitted and received on the overlapping time-frequency resources.

Conventionally, the base station may transmit a transmit power control (TPC) to indicate a power adjustment for all transmissions of one or more UEs. However, the TPC may be inefficient for adjusting power and scheduling simultaneous transmissions for different service types and transmission schemes. For example, the TPC may adjust a transmit power for all subsequent uplink transmissions across all time-frequency resources for one or more UEs. Additionally, the TPC adjustment may continue until another, subsequent TPC is issued.

As described herein, the base station may transmit a power adjustment indication (PAI) to indicate an adjustment for transmit powers for specific transmissions on certain time-frequency resources. The PAI may include an indication of a power adjustment for uplink transmissions of one or more UEs for a certain time duration on a certain set of frequency resources. For example, the PAI may indicate a start and end time for the power adjustment and the frequency resources for the power adjustment. As such, any UEs with grant-free uplink transmissions that occur on at least some of the indicated resources may adjust their transmit power. The base station may transmit the PAI through broadcast signaling, multicast signaling (e.g., a group-common transmission), or another dynamic DCI indication. Additionally, the base station may transmit the PAI according to a periodicity based on a periodicity for the grant-free transmissions, and the UEs may monitor for the PAI based on the same periodicity.

Aspects of the disclosure are initially described in the context of a wireless communications system. An additional wireless communications system, a monitoring configuration, and an example of a process flow are then provided to illustrate aspects of the disclosure. Aspects of the disclosure are further illustrated by and described with reference to apparatus diagrams, system diagrams, and flowcharts that relate to temporary PAI for uplink transmissions.

Figure 1:
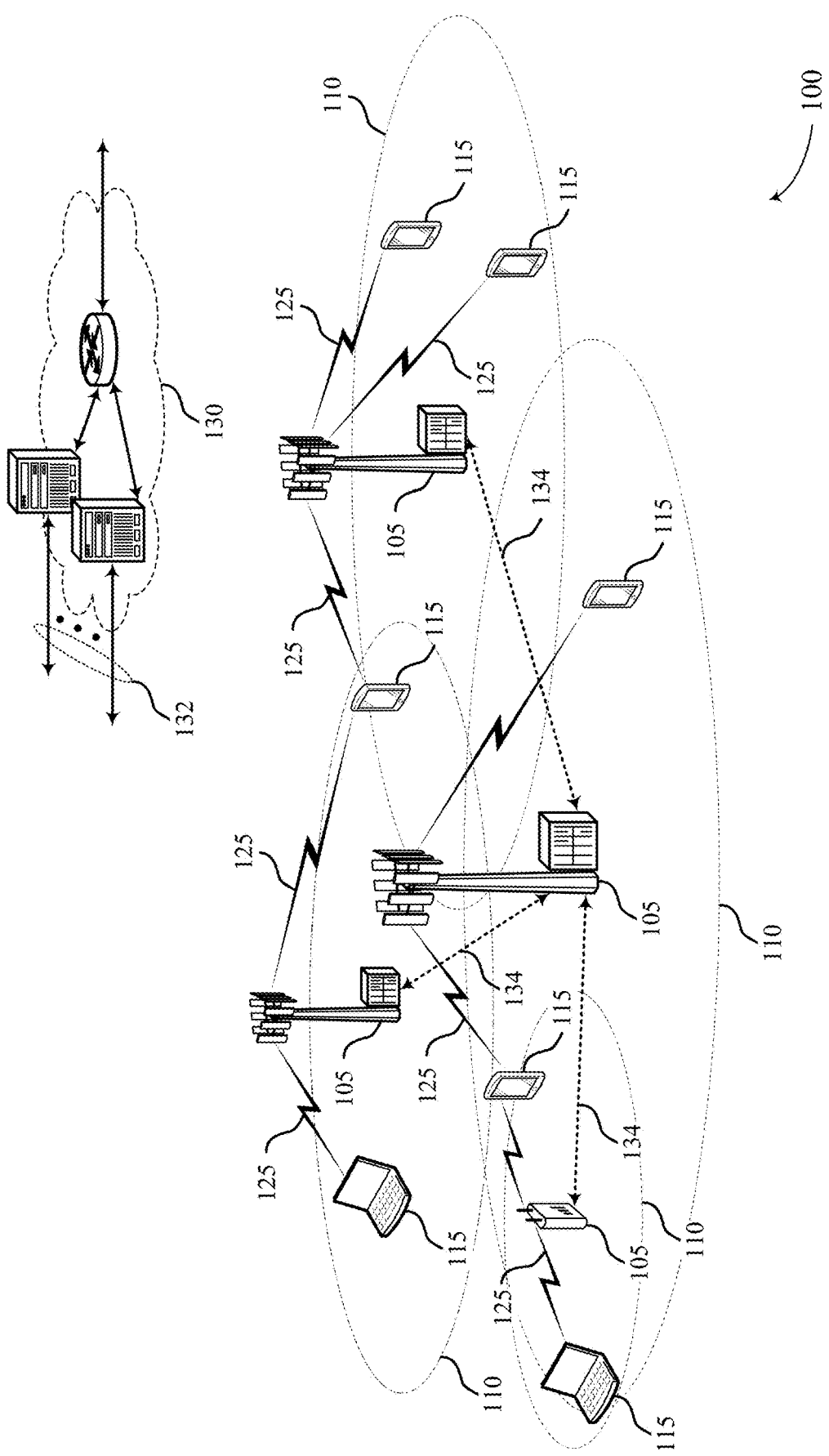
FIG. 1 illustrates an example of a wireless communications system that supports temporary power adjustment indication (PAI) for uplink transmissions in accordance with aspects of the present disclosure.

FIG. 1 illustrates an example of a wireless communications system 100 that supports temporary PAI for uplink transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carrier (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, multiple services may be supported that require different reliability and latency qualities. For example, enhanced mobile broadband (eMBB) services may support a first set of reliability and latency standards, while ultra-reliable low latency communications (URLLC) services may support a second set of standards with higher reliability and lower latency than the eMBB services. In order to more efficiently utilize a spectrum of time-frequency resources, UEs 115 configured with different services may be dynamically multiplexed in the same time-frequency resources.

Additionally, both grant-based and grant-free transmissions may be supported in the same wireless communications system. The grant-based transmissions may indicate a scheme where each data transmission may be scheduled by a corresponding downlink channel (e.g., physical downlink control channel (PDCCH), downlink control information (DCI), etc.). The grant-based transmissions may be more dynamic than grant-free transmissions. Grant-free transmissions may include a sequence of transmission opportunities scheduled semi-statically (e.g., by RRC signaling or activated by PDCCH). The sequence of transmission opportunities may include resources pre-allocated to a UE 115 on which to transmit uplink data without a grant. The grant-free transmission may be referred to as uplink transmissions with a configured grant, where the configured grant triggers the sequence of transmissions without DCI. In some cases, a base station 105 may multiplex UEs 115 configured for different services and with the different transmission schemes (e.g., grant-free and grant-based transmissions) such that uplink transmissions from the UEs 115 may both be received at the base station 105 (e.g., simultaneously).

However, in some cases, the base station 105 may dynamically schedule traffic for multiple services on the same set of resources, which may cause interference or similarly affect the traffic for one service or another. For example, the base station 105 may configure grant-free transmission opportunities for one or more UEs 115 operating according to URLLC (e.g., URLLC UEs 115) on respective sets of time-frequency resources. The base station 105 may then schedule an uplink transmission for a different UE 115 operating according to eMBB (e.g., eMBB UE 115) on a set of time-frequency resources that at least partially overlap with the time-frequency resources for the grant-free transmission opportunities. As such, the base station 105 may accommodate the uplink transmission for the eMBB UE 115, while meeting the reliability and latency requirements for the grant-free transmission opportunities of the URLLC UEs 115 (e.g., both transmissions may be sent simultaneously and received at the base station 105).

In some cases, the base station 105 may adjust the power of one or both transmissions to ensure both are transmitted and received on the overlapping time-frequency resources. For example, the base station 105 may transmit a TPC to indicate a power adjustment for all transmissions of one or more UEs 115. The TPC may be a group-common TPC dynamically transmitted (e.g., in a PDCCH) to a group of UEs 115. The group-common TPC may indicate a TPC command for a physical uplink control channel (PUCCH)/physical uplink shared channel (PUSCH) and a sounding reference signal (SRS). Additionally or alternatively, the group-common TPC may be multi-casted to the group of UEs in a first DCI format (e.g., DCI format 2_2) for PUCCH/PUSCH or in a second DCI format (e.g., DCI format 2_3) for SRS. Accordingly, each UE 115 may adjust their transmit power separately, where the adjusted transmit power applies to the rest of grant-free transmissions until a subsequent TPC is received. Additionally, a CRC for the grant-free transmissions may be scrambled based on the TPC and respective radio network temporary identifiers (RNTIs). For example, the CRC may be scrambled by a TPC-PUSCH-RNTI for PUSCH transmissions, by a TPC-PUCCH-RNTI for a PUCCH transmission, or by a TPC-SRS-RNTI for an SRS transmission.

Conventional systems as described herein using a group-common TPC or a UE-specific TPC may be inefficient for adjusting power and scheduling simultaneous transmissions for different service types and transmission schemes. For example, a TPC command may be intended for small power adjustments (e.g., 1-3 dB) to adapt transmit powers based on channel conditions. In some cases, a base station 105 may transmit the TPC to overcome path loss for transmissions or a similar large-scale parameter of a channel. As such, the TPC may adjust a transmit power for all subsequent uplink transmissions across all time-frequency resources for one or more UEs 115 (e.g., via the group-common TPC). In some cases, an uplink preemption indication (PI) may be transmitted by the base station 105 in transmissions of different services are scheduled to overlap. However, the uplink PI may enable a UE 115 to drop transmissions associated with a lower priority service (e.g., eMBB traffic) to accommodate transmissions associated with a higher priority service (e.g., URLLC traffic). As such, efficient techniques are desired to both adjust transmit power with greater granularity than a TPC command and to accommodate traffic for multiple services simultaneously.

Wireless communications system 100 may support a PAI to indicate an adjustment for transmit powers for specific transmissions on certain time-frequency resources. The PAI may include an indication of a power adjustment for uplink transmissions of one or more UEs 115 for a certain time duration on a certain set of frequency resources. For example, the PAI may indicate a start and end time for the power adjustment and the frequency resources for the power adjustment. As such, any UEs 115 with grant-free uplink transmissions that occur on at least some of the indicated resources may adjust their transmit power. The PAI may enable the UEs 115 to adjust transmit powers on a larger scale to combat interference, reduce signaling overhead by reducing the number of times needed to indicate power adjustments, and adjust transmit power for a temporary timeframe and/or on particular frequency resources, which may reduce power consumption at the UEs 115. Since the base station 105 is aware of the overlapping resources based on scheduling the resources for both transmissions, it may be able to adjust the transmit power more appropriately through the PAI. The base station 105 may transmit the PAI through broadcast signaling, multicast signaling, or another dynamic DCI indication, including group-common signaling. Multicast signaling may be an example of a group-common transmission. Additionally, the base station 105 may transmit the PAI according to a periodicity based on a periodicity for the grant-free transmissions, and the UEs 115 may monitor for the PAI based on the same periodicity.

Figure 2:
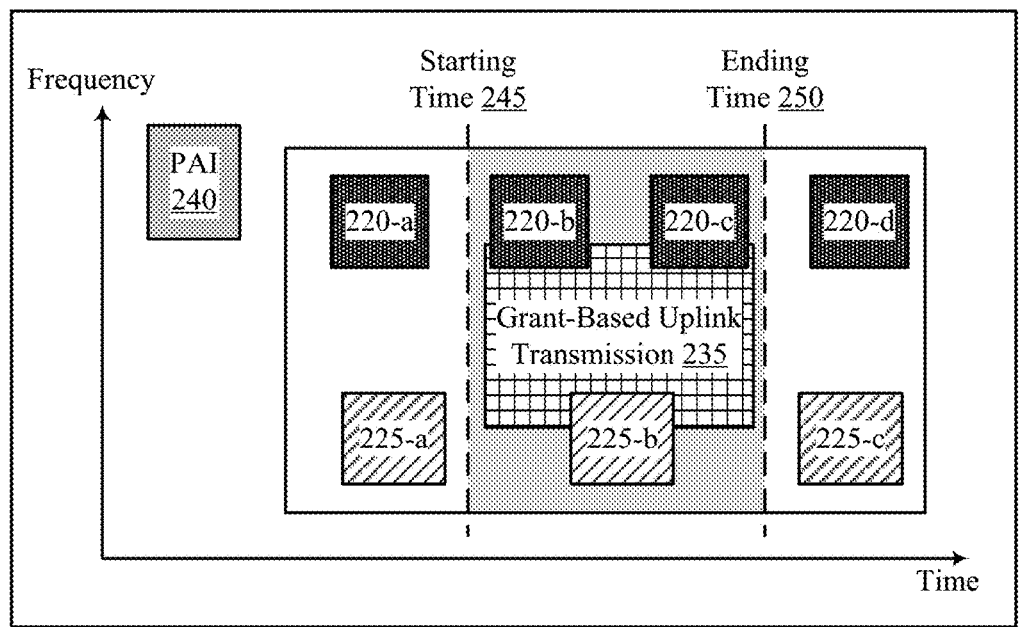
FIG. 2 illustrates an example of a wireless communications system that supports temporary PAI for uplink transmissions in accordance with aspects of the present disclosure.
Figure 2:
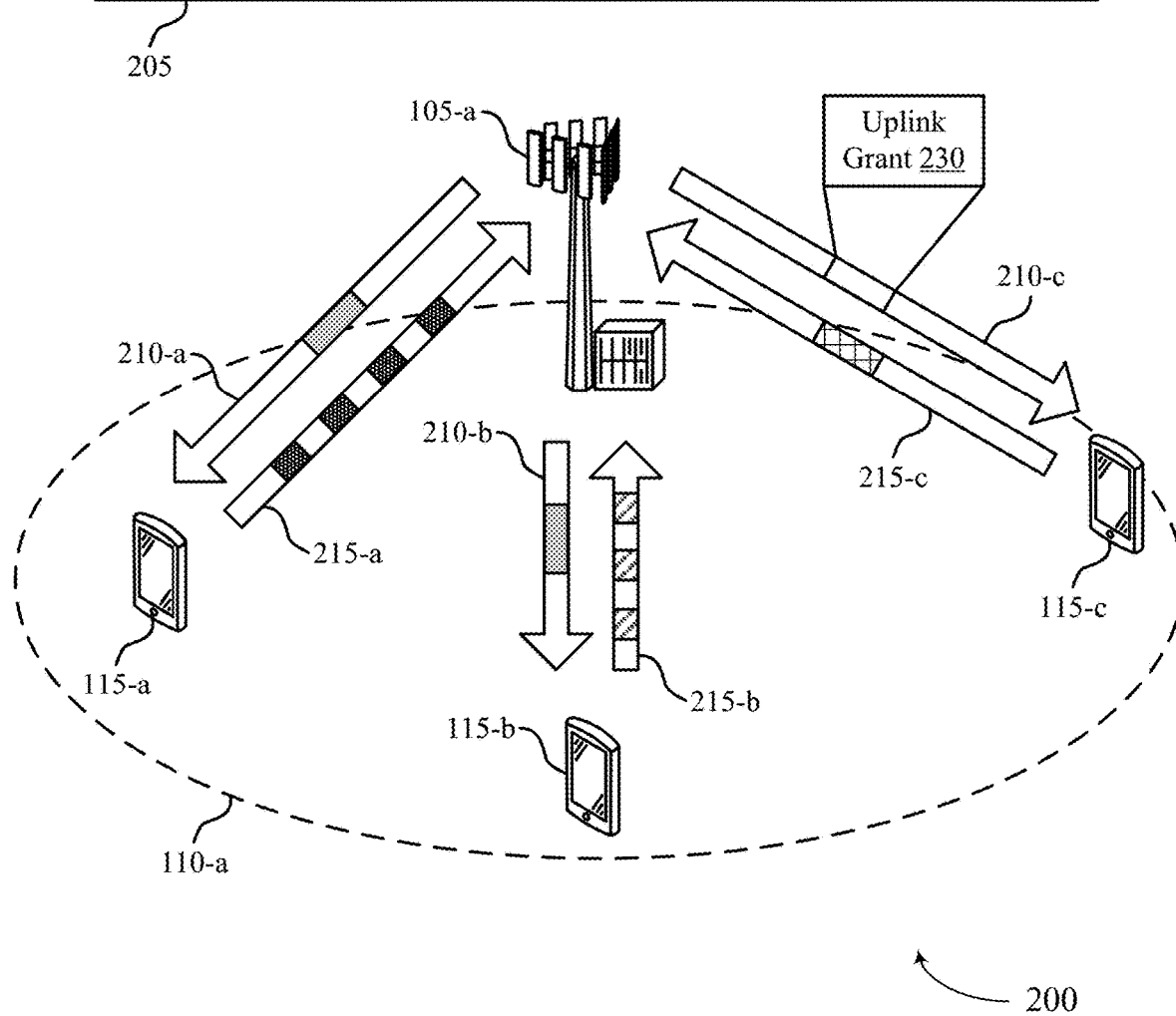

FIG. 2 illustrates an example of a wireless communications system 200 that supports temporary PAI for uplink transmissions in accordance with aspects of the present disclosure. In some examples, wireless communications system 200 may implement aspects of wireless communications system 100. Wireless communications system 200 may include a base station 105-a, a UE 115-a, a UE 115-b, and a UE 115-c, which may be examples of corresponding base stations 105 and UEs 115, respectively, as described herein with reference to FIG. 1. Base station 105-a and the UEs 115 may transmit data back and forth according to communications 205. For example, base station 105-a may send downlink transmissions 210 to each UE 115 on respective carriers, via broadcasted messages, multicast messages (e.g., a group-common transmission), or a combination thereof. Additionally, each UE 115 may send uplink transmissions 215 to base station 105-a (e.g., on resources of respective carriers).

In some cases, UE 115-a and UE 115-b may be configured for grant-free uplink transmissions (e.g., uplink transmissions with configured grants) to base station 105-a, where resources are pre-allocated to each UE 115 for the grant-free uplink transmissions. For example, UE 115-a and UE 115-b may be URLLC devices and be configured to transmit information periodically to base station 105-a if data is present to be transmitted. Accordingly, one or more uplink occasions 220 and 225 (e.g., grant-free PUSCH occasions) may be configured for UE 115-a and UE 115-b, respectively. The sequence of uplink occasions 220 and 225 (e.g., sequence of transmission opportunities) may be scheduled by either RRC signaling or activated by a PDCCH. If either UE 115 does not have a packet for transmission when a corresponding uplink occasion 220 or 225 occurs, the UE 115 may refrain from transmitting during the uplink occasion. As described herein, base station 105-a may dynamically schedule traffic for UE 115-c on resources allocated to the uplink occasions 220 and 225 for the grant-free uplink transmissions. For example, base station 105-a may transmit an uplink grant 230 in downlink transmission 210-c to UE 115-c that schedules a grant-based uplink transmission 235, where UE 115-c supports eMBB service. In some cases, the resources allocated to grant-based uplink transmission 235 may overlap resources of uplink occasions 220-b and 220-c for UE 115-a and uplink occasion 225-b for UE 115-b.

Accordingly, base station 105-a may adjust uplink transmissions 215-a and 215-b for UEs 115-a and 115-b, respectively, to support the simultaneous traffic and ensure transmissions from each UE 115 is received correctly. For example, base station 105-a may transmit a PAI 240 to indicate a power adjustment for UEs 115 with grant-free transmissions. UE 115-a and UE 115-b may receive PAI 240 in downlink transmissions 210-a and 210-b, respectively. Additionally, PAI 240 may indicate for the UEs 115 with grant-free transmissions to temporarily adjust their transmit powers for a certain time duration. For example, UEs 115-a and 115-b may adjust their transmit powers based on a temporary specified or known finite duration (e.g., the certain time duration). In some cases, the power adjustment may indicate that the UEs 115 may increase their transmit power by a certain number of decibels (e.g., X dB) or may decrease their transmit power by a certain number of decibels (e.g., Y dB). Additionally, the certain time duration may be for a particular slot that is a certain number of slots (e.g., k slots) after reception of PAI 240 or a set of time resources (e.g., OFDM symbols) within a slot. For example, PAI 240 may indicate a starting time 245 and an ending time 250 for the temporary power adjustment through the particular slot indication or the set of time resources. Accordingly, UE 115-a may adjust (e.g., increase) the transmit power for traffic during uplink occasions 220-b and 220-c, and UE 115-b may adjust (e.g., increase) the transmit power for traffic during uplink occasion 225-b. By adjusting the transmit power, grant-based uplink transmissions 235 may have less impact on the traffic transmitted during uplink occasions 220-b, 220-c, and 225-b, and, as such, cause less interference with the traffic. As described herein, base station 105-a may transmit PAI 240 in a dynamic DCI message.

In some cases, base station 105-*a* may transmit PAI 240 via a broadcast message (e.g., broadcast DCI or a group-common DCI) to all UEs 115 within a geographic coverage area 110-*a*. Information in PAI 240 may include the power adjustment as described herein, a time duration for the temporary power adjustment, and frequency-domain resources for the temporary power adjustment. In some cases, the information for PAI 240 may be included within separate indicators or may be all signaled within PAI 240 (e.g., in one, encompassing indication). As such, a UE 115 in geographic coverage area 110-*a* may monitor for and receive PAI 240. The UE 115 may then compare the time duration and frequency-domain resources (e.g., time-frequency resources) for the temporary power adjustment with its own uplink occasions, and if the indicated time-frequency resources overlap its uplink transmissions in the corresponding uplink occasions, the UE 115 may adjust the transmit power for the overlapped uplink transmissions. As such, base station 105-*a* may refrain from transmitting any indication of a UE 115 identities when broadcasting PAI 240 since each UE 115 that receives the broadcast may make its own determination for the power adjustment based on the comparison. However, the broadcasted PAI 240 may indicate a transmit power adjustment to improve reliability for all UEs 115 in geographic coverage area 110-*a*, and not specific to each UE 115.

Additionally or alternatively, base station 105-*a* may transmit PAI 240 via a multicast message (e.g., multicast DCI or a group-common DCI) to UEs 115 within geographic coverage area 110-*a*. In some cases, the multicast message may be referred to as a PAI-DCI. Additionally, the PAI-DCI may include several fields, where each field corresponds to a power adjustment for one particular UE 115. Each UE 115 configured for grant-free transmissions may be semi-statically configured with an index for a field in the PAI-DCI and the length of the PAI-DCI (i.e., the payload size of the PAI-DCI). For example, base station 105-*a* (e.g., the network) may configure UE 115-*a* and UE 115-*b* with a payload of M×L bits (e.g., payload size) and an index m, such that 1≤m≤M, indicating that each field of the several fields of the PAI-DCI has a bandwidth of L bits and the m-th field belongs to the particular UE 115. Accordingly, each UE 115 configured for grant-free transmissions may monitor for the PAI-DCI, and if a UE 115 detects the PAI-DCI, it may look for a corresponding field in the PAI-DCI and perform a power adjustment as indicated. In some cases, the power adjustment may indicate no power adjustment (e.g., if uplink transmissions for the corresponding UE 115 are not affected by grant-based uplink transmission 235). As such, the PAI-DCI may not indicate time-frequency resources for the indicated power adjustment because a power adjustment may be specific to each UE 115, and each UE 115 may determine to adjust the transmit power for a current uplink transmission or in an associated uplink time duration (e.g., uplink period, slot, etc.).

In some cases, each UE 115 configured for grant-free transmissions may monitor for PAI 240 according to a periodicity. For example, UEs 115-*a* and 115-*b* may monitor for the PAI-DCI as described herein based on a periodicity for their grant-free uplink transmissions (e.g., periodicity of uplink occasions 220 and 225). The UEs 115 may be configured to monitor for the PAI-DCI with a periodicity based on the uplink transmission periodicity because base station 105-*a* may transmit the PAI-DCI to dynamically adjust the transmit power of the grant-free uplink transmissions, so if both periodicities are the same, the monitoring occasions may align with corresponding grant-free uplink transmissions. As such, PAI 240 may apply to uplink transmissions in one corresponding period for the grant-free uplink transmissions. For example, the UE 115 may receive the PAI-DCI in the $N^{th}$ monitoring period and may make the corresponding power adjustment in the grant-free transmission period N+k (e.g., k=0 or k=1 etc.). If the periodicity of the uplink transmissions is less than a slot (e.g., URLLC traffic), then base station 105-*a* may transmit the PAI-DCI with a periodicity of one-slot, and the UEs 115 may monitor for the PAI-DCI for each slot.

Figure 3:
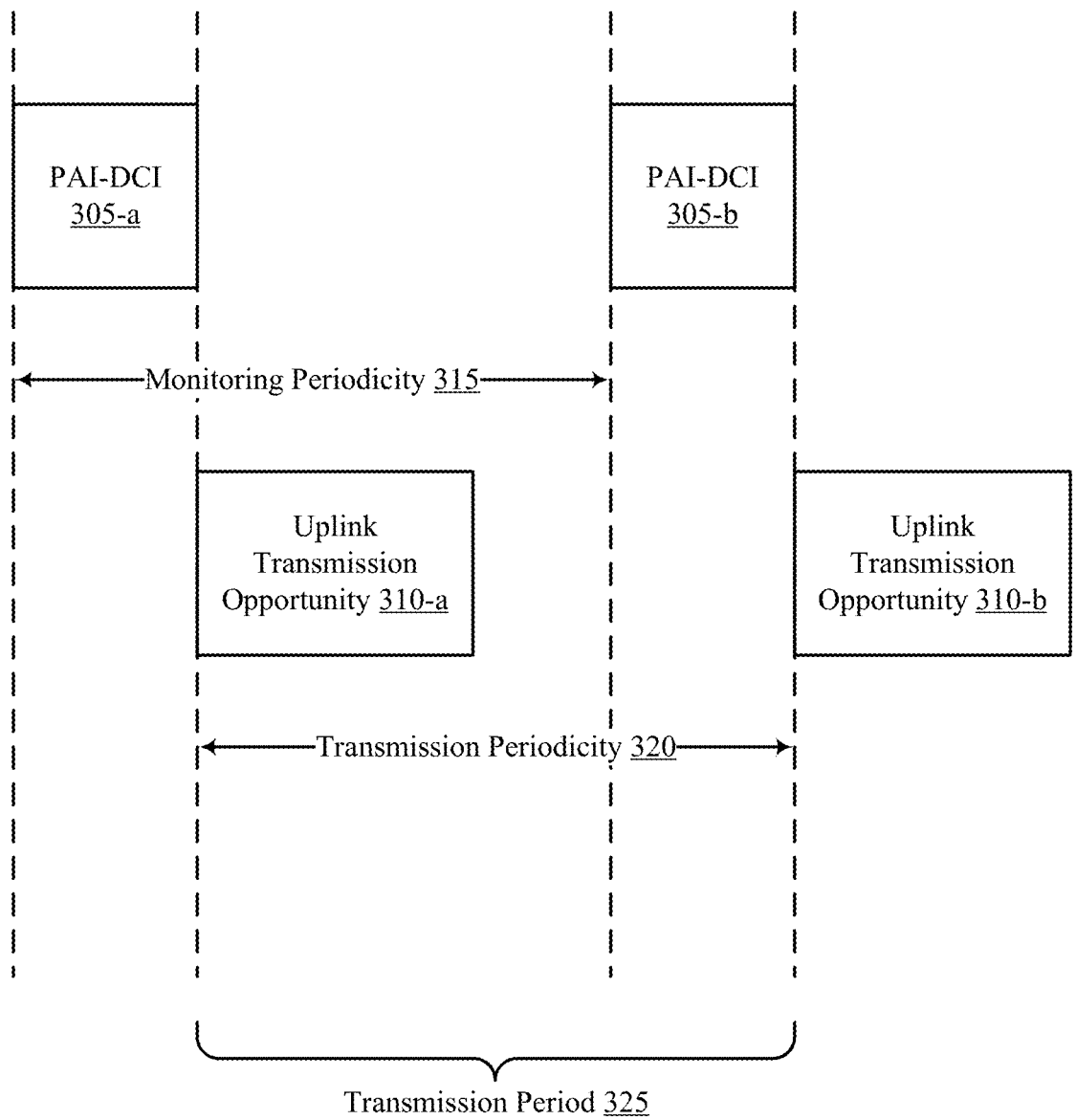
FIG. 3 illustrates an example of a monitoring configuration that supports temporary PAI for uplink transmissions in accordance with aspects of the present disclosure.

FIG. 3 illustrates an example of a monitoring configuration 300 that supports temporary PAI for uplink transmissions in accordance with aspects of the present disclosure. In some examples, monitoring configuration 300 may implement aspects of wireless communications systems 100 and/or 200. Monitoring configuration 300 may be implemented by a UE 115 configured for grant-free transmissions. In some cases, a base station 105 may transmit a PAI to indicate a power adjustment for one of the grant-free transmissions if a dynamically scheduled uplink transmission overlaps (e.g., at least partially) with the grant-free transmissions. As such, the UE 115 may monitor for the PAI to determine whether to adjust the transmit power based on monitoring configuration 300.

The base station 105 may transmit a PAI-DCI 305 when signaling the PAI to one or more UEs 115 in a multicast transmission (e.g., a group-common transmission) as described herein with reference to FIG. 2. In some cases, the base station 105 may transmit the PAI-DCI 305 according to a periodicity based on a periodicity for the grant-free transmissions. Accordingly, the UE 115 may monitor for the PAI-DCIs 305 based on a monitoring periodicity 315, which may be the same as a transmission periodicity 320 for one or more configured uplink transmission opportunities 310. If the UE 115 receives a PAI-DCI 305, the indicated adjusted power may be implemented for a transmission period 325. For example, PAI-DCI 305-*a* may apply to uplink transmission opportunity 310-*a* because it is within transmission period 325, but may not apply to uplink transmission opportunity 310-*b* because it falls within a subsequent transmission period. Accordingly, the base station 105 may indicate a subsequent PAI in PAI-DCI 305-*b* that applies to uplink transmission opportunity 310-*b*.

In some cases, transmission periodicity 320 may be less than a slot in duration (e.g., for URLLC traffic). In such cases, the periodicity with which the PAI-DCIs 305 are transmitted and monitoring periodicity 315 may be one slot. As such, more than one uplink transmission opportunity 310 may be transmitted within transmission period 325, and the PAI indicated in the preceding PAI-DCI may apply to all uplink transmission opportunities 310 within transmission period 325.

Although transmission opportunity 310 has a periodicity of less than one slot (e.g., for URLLC traffic), interference (e.g., eMBB) may be scheduled on a per slot basis and this may span an entire slot. Thus, a UE 115 may apply PAI-DCI 305 to all uplink transmission opportunities 310, because the scheduled interference or uplink transmissions may potentially interfere with all uplink opportunities within the slot.

Figure 4:
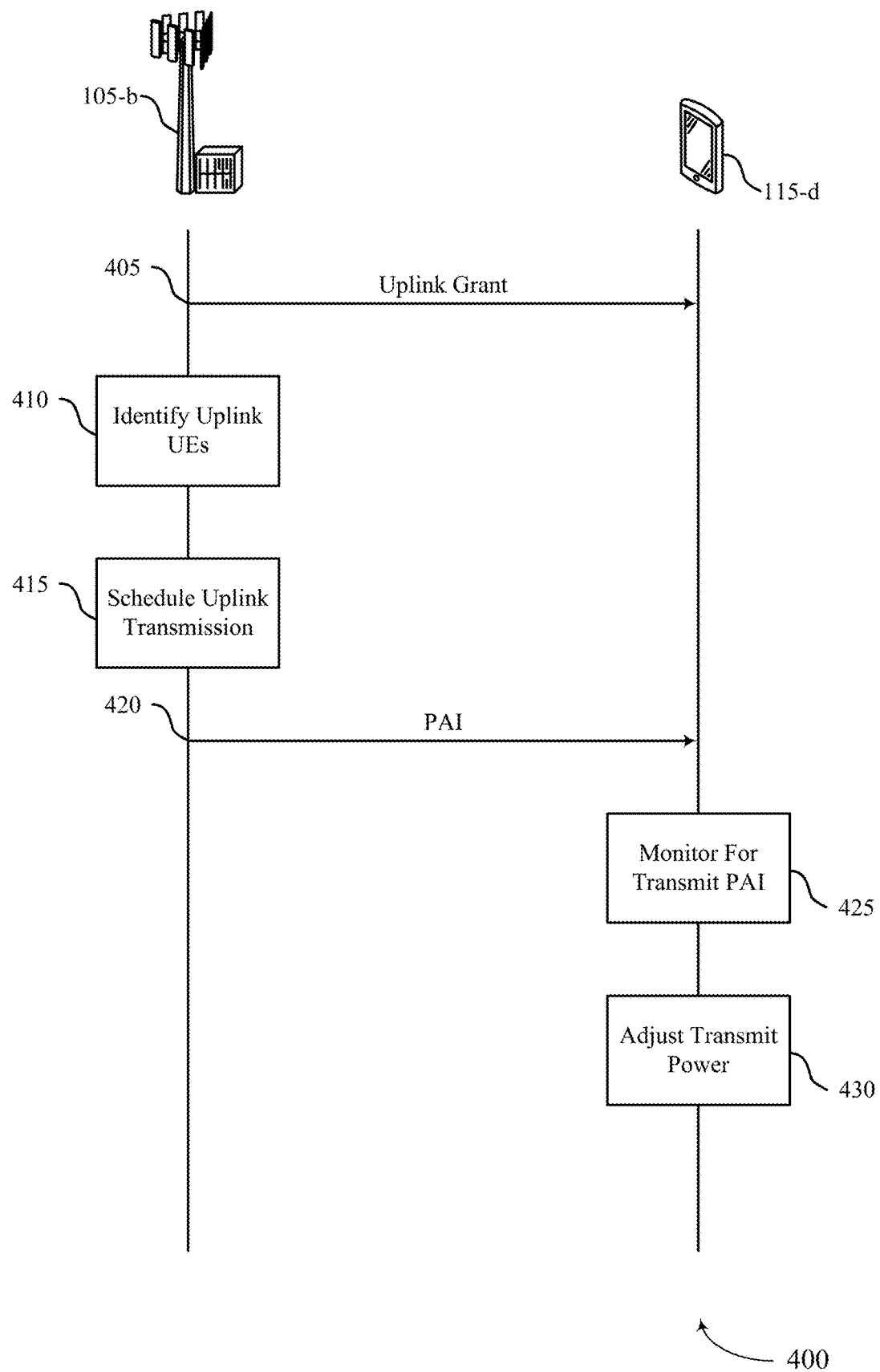
FIG. 4 illustrates an example of a process flow that supports temporary PAI for uplink transmissions in accordance with aspects of the present disclosure.

FIG. 4 illustrates an example of a process flow 400 that supports temporary PAI for uplink transmissions in accordance with aspects of the present disclosure. In some examples, process flow 400 may implement aspects of wireless communications systems 100 and/or 200. Process flow 400 may include a base station 105-*b* and a UE 115-*d*, which may be examples of corresponding base stations 105 and UEs 115, respectively, as described herein with reference to FIGS. 1-3. As described herein, UE 115-d may be a URLLC UE 115 configured with a sequence of uplink occasions for grant-free uplink transmissions.

In the following description of the process flow 400, the operations between UE 115-d and base station 105-b may be performed in different orders or at different times. Certain operations may also be left out of the process flow 400, or other operations may be added to the process flow 400. It is to be understood that while UE 115-d and base station 105-b are shown performing a number of the operations of process flow 400, any wireless device may perform the operations shown.

At 405, UE 115-d may receive, from base station 105-b, a grant for autonomous uplink transmissions (e.g., grant-free uplink transmissions) to base station 105-b on a set of allocated resources.

At 410, base station 105-b may identify that one or more first UEs 115 (including UE 115-d) have been allocated resources via a grant for autonomous uplink transmissions to base station 105-b.

At 415, base station 105-b may schedule an uplink transmission of a second UE 115 (e.g., an eMBB UE 115) to base station 105-b, where the scheduled uplink transmission of the second UE 115 at least partially overlaps the allocated resources provided to the first UEs 115.

At 420, base station 105-b may transmit to the one or more first UEs 115 a transmit PAI that the one or more first UEs 115 are to adjust a transmit power of uplink transmissions on the allocated resources for a specified time duration. Additionally, base station 105-b may transmit, with the transmit PAI, an indication of frequency-domain resources to which the transmit power adjustment is to be applied, an indication of the specified time duration during which the transmit power adjustment is to be applied, an indication of specific uplink transmissions to which the transmit power adjustment is to be applied, or a combination thereof. In some cases, base station 105-b may transmit the transmit PAI in a dynamic DCI message. Additionally or alternatively, base station 105-b may broadcast the transmit PAI and may include in the broadcast an indication of at least one of time or frequency resources to which the transmit power adjustment is to be applied.

Additionally or alternatively, base station 105-b may multicast the transmit PAI to at least some of the first UEs via a DCI message, where the DCI message includes one or more UE-specific fields that each include a UE-specific transmit PAI. In some cases, at least one UE-specific transmit PAI may indicate that transmit power is not to be adjusted. Additionally, base station 105-b may configure the at least some of the first UEs 115 with a field index of the respective UE-specific fields in the DCI message and a payload size or length of the DCI message. In some cases, the specified time duration is either one slot or one period of the allocated resources. Accordingly, base station 105-b may transmit the DCI message using a same periodicity as that of the allocated resources, using a slot-based periodicity, or a combination thereof.

At 425, UE 115-d may monitor resources for a signal that includes the transmit PAI. In some cases, UE 115-d may receive a configuration that indicates the resources that it is to monitor for receipt of the transmit PAI (e.g., at 405 with the grant for autonomous uplink transmissions or at another time). Accordingly, UE 115-d may receive the transmit PAI, indicating that it is to adjust a transmit power of uplink transmissions on the set of allocated resources for a specified time duration. Based on how base station 105-b transmits the transmit PAI, UE 115-d may receive the transmit PAI in the dynamic DCI, as the broadcast, or via the multicast DCI message. The broadcast message or multicast DCI message may be examples of group-common DCI messages. If the transmit PAI is transmitted as the broadcast, UE 115-d may compare the at least one of time or frequency resources to which the transmit power adjustment is to be applied with the set of allocated resources, where the uplink transmission whose transmit powers are to be adjusted in accordance with the transmit PAI are the uplink transmission within the set of allocated resources that overlap with the at least one of time or frequency resources to which the transmit power adjustment is to be applied. Additionally or alternatively, UE 115-d may determine the specified time duration based on a configuration previously received (e.g., at 405 or another time).

At 430, UE 115-d may adjust the transmit power of uplink transmissions on the set of allocated resources during the specified time duration in accordance with the transmit PAI. For example, the transmit PAI may include a number of decibels by which the first UEs 115 are to increase the transmit power of uplink transmissions on the allocated resources, and, as such, UE 115-d may increase the transmit power of uplink transmissions on the set of allocated resources by the number of decibels specified. Additionally or alternatively, the transmit PAI may include a number of decibels by which the first UEs 115 are to decrease the transmit power of uplink transmissions on the allocated resources, and, as such, UE 115-d may decrease the transmit power of uplink transmissions on the set of allocated resources by the number of decibels specified. In some cases, UE 115-d may adjust the transmit power of uplink transmissions on the set of allocated resources during a particular slot identified by base station 105-b. For example, UE 115-d may receive an indication of the particular slot with receipt of the transmit PAI. Alternatively, UE 115-d may receive an indication of the particular slot via a configuration message received before receipt of the transmit PAI (e.g., at 405 or another time). Additionally or alternatively, UE 115-d may adjust the transmit power of uplink transmissions on the set of allocated resources during a same slot in which the UE 115-d received the transmit PAI.

Figure 5:
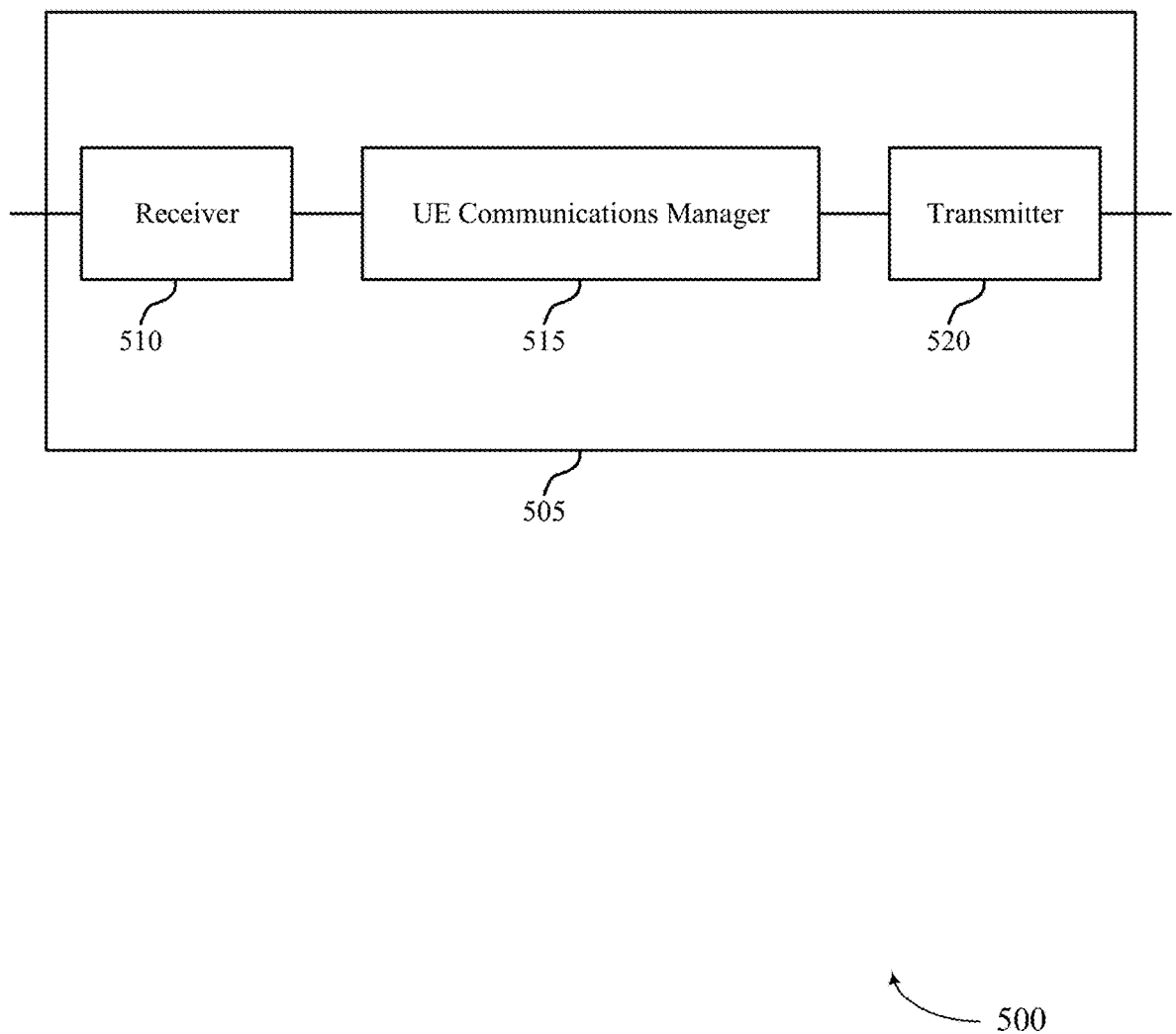
FIGS. 5 and 6 show block diagrams of devices that support temporary PAI for uplink transmissions in accordance with aspects of the present disclosure.

FIG. 5 shows a block diagram 500 of a device 505 that supports temporary PAI for uplink transmissions in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to temporary PAI for uplink transmissions, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive a grant for autonomous uplink transmissions to a base station on a set of allocated resources. Additionally, the UE communications manager 515 may receive a transmit PAI, indicating that the UE is to adjust a transmit power of uplink transmissions on the set of allocated resources for a specified time duration. Accordingly, the UE communications manager 515 may adjust the transmit power of uplink transmissions on the set of allocated resources during the specified time duration in accordance with the transmit PAI. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by UE communications manager 515, as described herein, may be implemented to realize one or more potential advantages. One implementation may allow coexistence of UEs 115 with different capabilities by multiplexing different UEs 115 with different capabilities within the same time-frequency resources. The coexistence of different UEs 115 within the same time-frequency resources may lead to improved spectrum utilization and decreased interference. Other actions performed by UE communications manager 515 may improve dynamic resource scheduling and support grant-based and grant-free transmissions.

In some examples, the UE communications manager 515 described herein may be implemented as a chipset of a wireless modem, and the receiver 510 and the transmitter 520 may be implemented as sets of analog components (e.g., amplifiers, filters, phase shifters, antennas, etc.) The wireless modem may obtain and decode signals from the receiver 510 over a receive interface, and may output signals for transmission to the transmitter 520 over a transmit interface.

Figure 6:
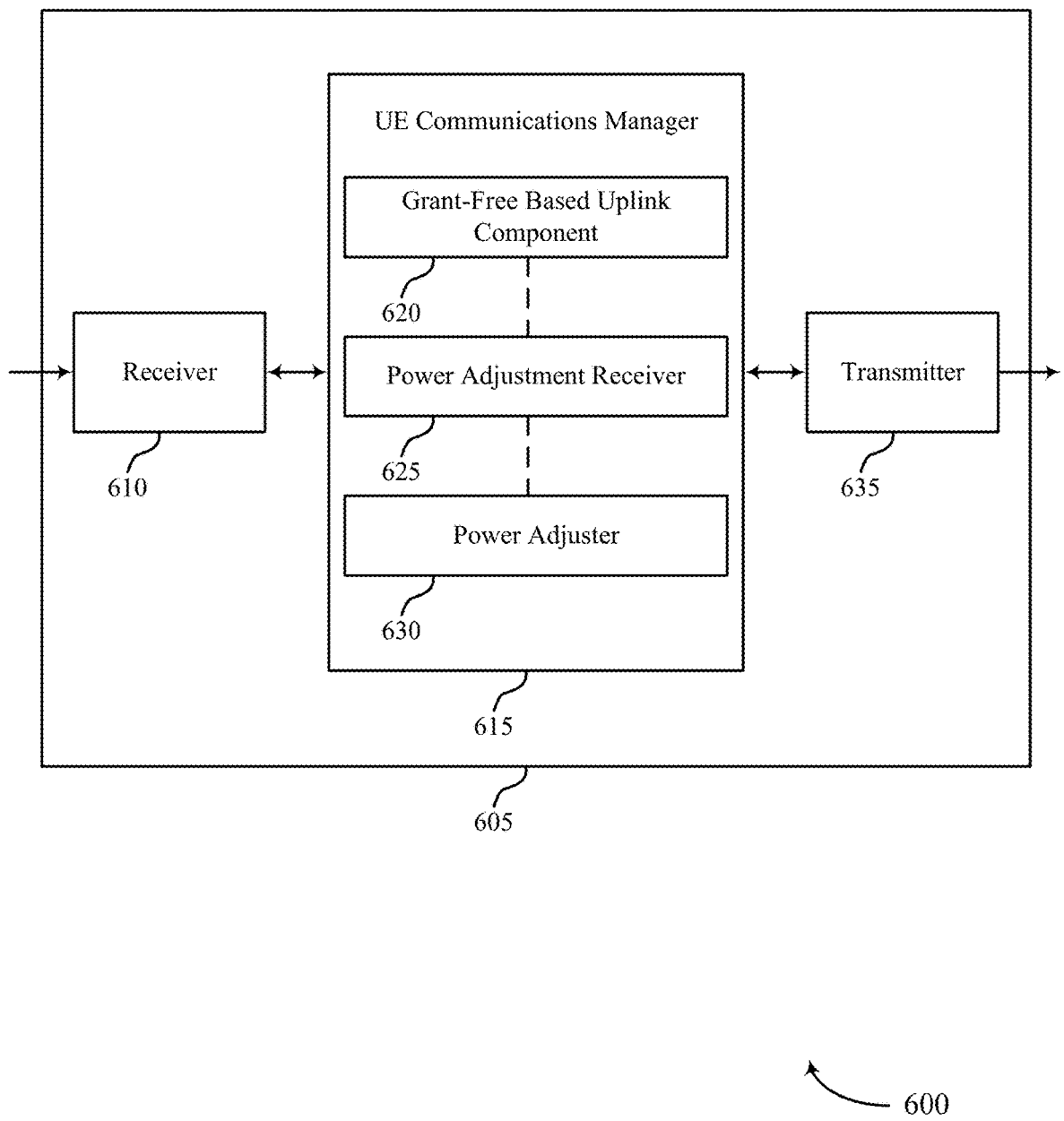

FIG. 6 shows a block diagram 600 of a device 605 that supports temporary PAI for uplink transmissions in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to temporary PAI for uplink transmissions, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a grant-free based uplink component 620, a power adjustment receiver 625, and a power adjuster 630. The UE communications manager 615 may be an example of aspects of the UE communications manager 810 described herein.

The grant-free based uplink component 620 may receive a grant for autonomous uplink transmissions to a base station on a set of allocated resources.

The power adjustment receiver 625 may receive a transmit PAI, indicating that the UE is to adjust a transmit power of uplink transmissions on the set of allocated resources for a specified time duration.

The power adjuster 630 may adjust the transmit power of uplink transmissions on the set of allocated resources during the specified time duration in accordance with the transmit PAI.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
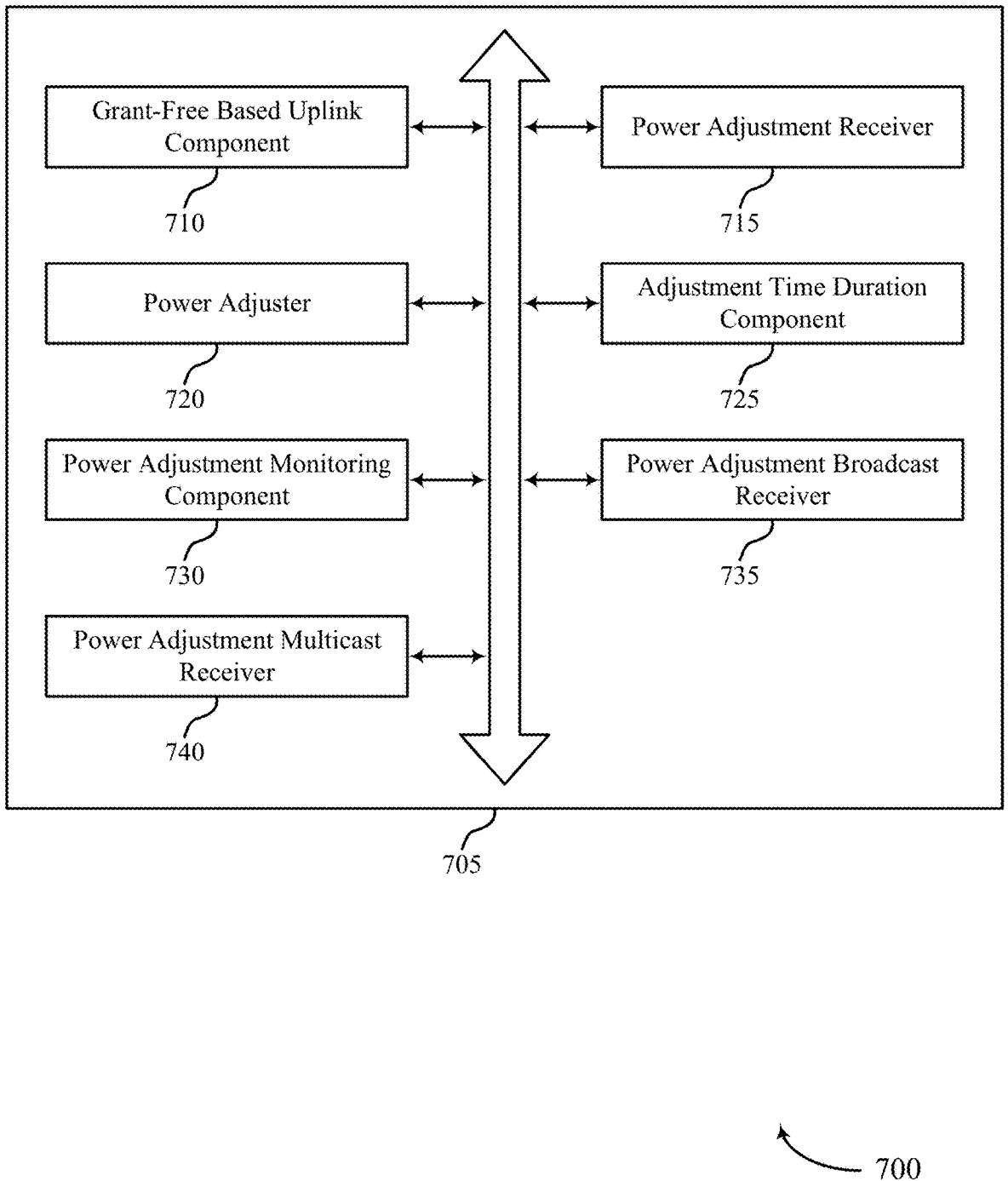
FIG. 7 shows a block diagram of a user equipment (UE) communications manager that supports temporary PAI for uplink transmissions in accordance with aspects of the present disclosure.

FIG. 7 shows a block diagram 700 of a UE communications manager 705 that supports temporary PAI for uplink transmissions in accordance with aspects of the present disclosure. The UE communications manager 705 may be an example of aspects of a UE communications manager 515, a UE communications manager 615, or a UE communications manager 810 described herein. The UE communications manager 705 may include a grant-free based uplink component 710, a power adjustment receiver 715, a power adjuster 720, an adjustment time duration component 725, a power adjustment monitoring component 730, a power adjustment broadcast receiver 735, and a power adjustment multicast receiver 740. Each of these modules may communicate, directly or indirectly, with one another (e.g., via one or more buses).

The grant-free based uplink component 710 may receive a grant for autonomous uplink transmissions to a base station on a set of allocated resources.

The power adjustment receiver 715 may receive a transmit PAI, indicating that the UE is to adjust a transmit power of uplink transmissions on the set of allocated resources for a specified time duration. In some examples, the power adjustment receiver 715 may receive, with the transmit PAI, an indication of frequency-domain resources to which the transmit power adjustment is to be applied, an indication of the specified time duration during which the transmit power adjustment is to be applied, an indication of specific uplink transmissions to which the transmit power adjustment is to be applied, or a combination thereof. In some examples, the power adjustment receiver 715 may receive the transmit PAI in a dynamic downlink control information message.

The power adjuster 720 may adjust the transmit power of uplink transmissions on the set of allocated resources during the specified time duration in accordance with the transmit PAI. In some examples, the power adjuster 720 may increase the transmit power of uplink transmissions on the set of allocated resources by a number of decibels specified by the transmit PAI. Additionally or alternatively, the power adjuster 720 may decrease the transmit power of uplink transmissions on the set of allocated resources by a number of decibels specified by the transmit PAI.

The adjustment time duration component 725 may determine the specified time duration based on a configuration previously received at the UE. In some examples, the adjustment time duration component 725 may adjust the transmit power of uplink transmissions on the set of allocated resources during a particular slot identified by the base station. Additionally or alternatively, the adjustment time duration component 725 may receive an indication of the particular slot with receipt of the transmit PAI. In some examples, the adjustment time duration component 725 may receive an indication of the particular slot via a configuration message received before receipt of the transmit PAI. Additionally or alternatively, the adjustment time duration component 725 may adjust the transmit power of uplink transmissions on the set of allocated resources during a same slot in which the UE received the transmit PAI.

The power adjustment monitoring component 730 may receive a configuration that indicates resources that the UE is to monitor for receipt of the transmit PAI. In some examples, the power adjustment monitoring component 730 may monitor the resources for a signal that includes the transmit PAI.

The power adjustment broadcast receiver 735 may receive the transmit PAI as a broadcast that includes an indication of at least one of time or frequency resources to which the transmit power adjustment is to be applied. In some examples, the power adjustment broadcast receiver 735 may compare the at least one of time or frequency resources to which the transmit power adjustment is to be applied with the set of allocated resources, where the uplink transmission whose transmit powers are to be adjusted in accordance with the transmit PAI are the uplink transmission within the set of allocated resources that overlap with the at least one of time or frequency resources to which the transmit power adjustment is to be applied.

The power adjustment multicast receiver 740 may receive the transmit PAI via a multicast downlink control information message, where the multicast downlink control information message includes one or more UE-specific fields that each include a UE-specific transmit PAI. In some examples, the power adjustment multicast receiver 740 may receive a configuration indicating a field index of the UE-specific field in the multicast downlink control information message that pertains to the UE and a payload size or length of the multicast downlink control information message.

Additionally or alternatively, the power adjustment multicast receiver 740 may receive the multicast downlink control information message via a same periodicity as that of the set of allocated resources for autonomous uplink transmissions. In some examples, the power adjustment multicast receiver 740 may receive the multicast DCI message via a slot-based periodicity. In some cases, the UE-specific transmit PAI may indicate that transmit power of the UE is not to be adjusted. In some cases, the specified time duration may be either one slot or one period of the set of allocated resources.

Figure 8:
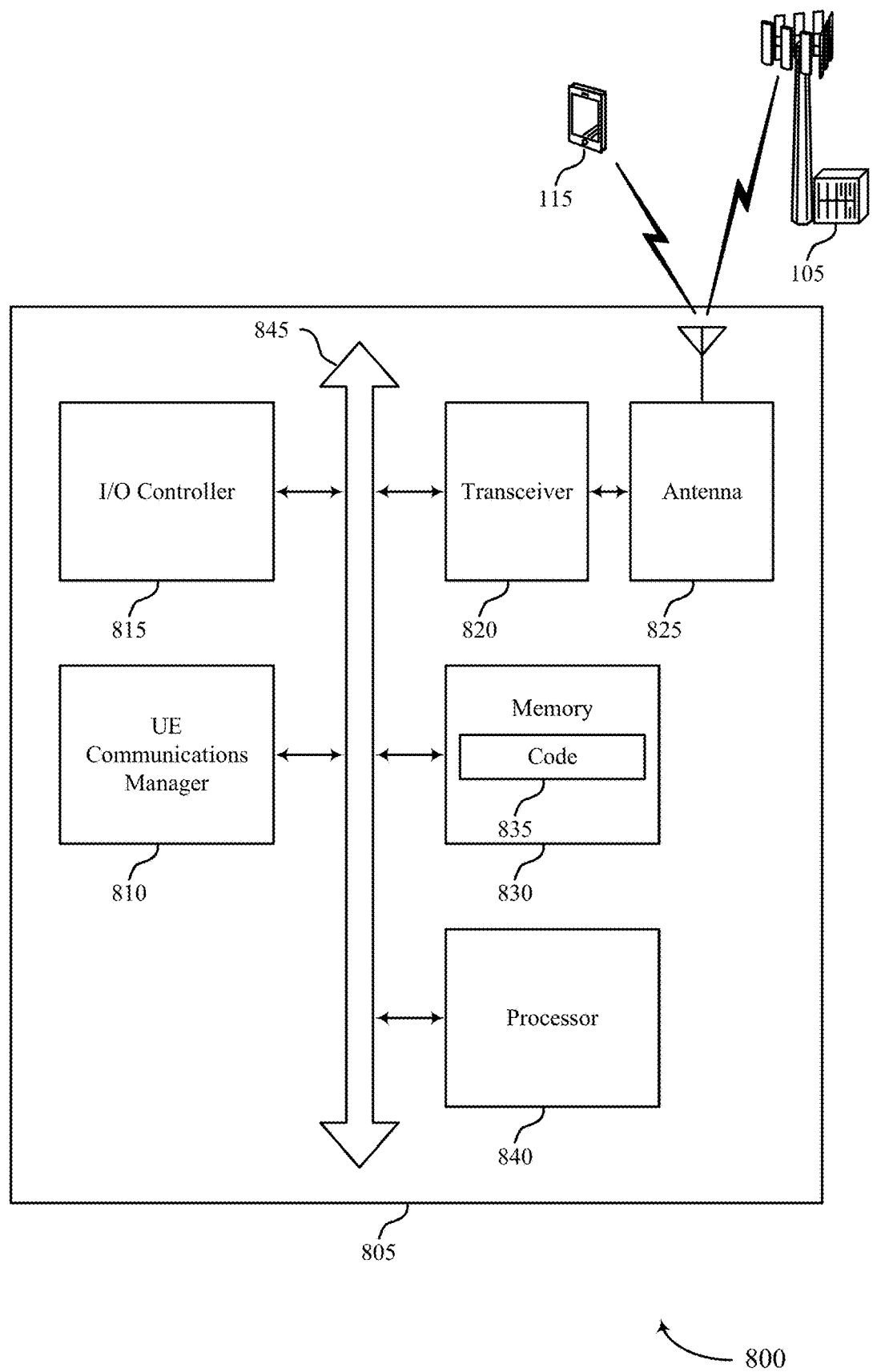
FIG. 8 shows a diagram of a system including a device that supports temporary PAI for uplink transmissions in accordance with aspects of the present disclosure.

FIG. 8 shows a diagram of a system 800 including a device 805 that supports temporary PAI for uplink transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive a grant for autonomous uplink transmissions to a base station on a set of allocated resources. Additionally, the UE communications manager 810 may receive a transmit PAI, indicating that the UE is to adjust a transmit power of uplink transmissions on the set of allocated resources for a specified time duration. Accordingly, the UE communications manager 810 may adjust the transmit power of uplink transmissions on the set of allocated resources during the specified time duration in accordance with the transmit PAI.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting temporary PAI for uplink transmissions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
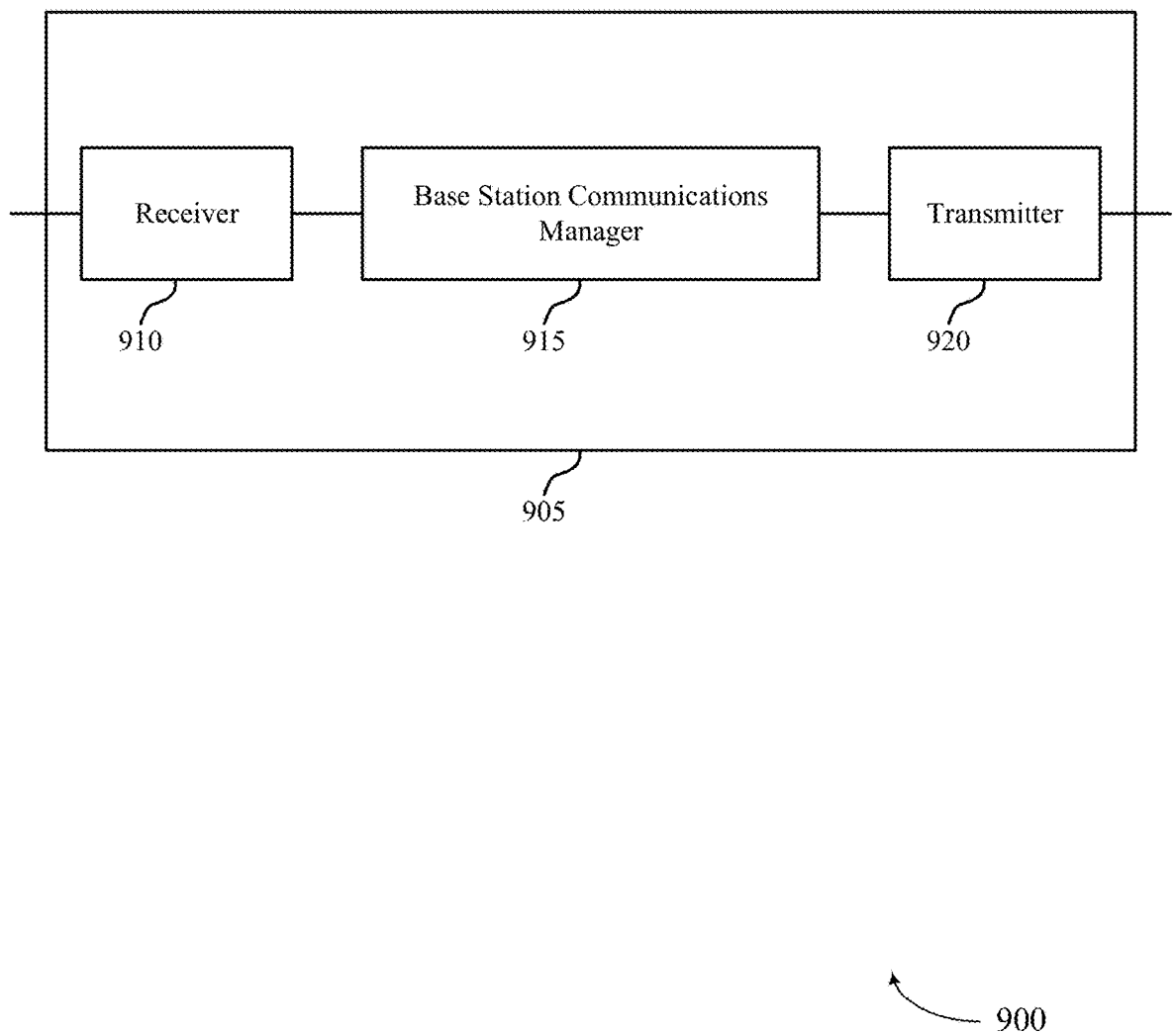
FIGS. 9 and 10 show block diagrams of devices that support temporary PAI for uplink transmissions in accordance with aspects of the present disclosure.

The functions performed by a processor 840 and components in communication with processor 840 may improve the efficient and the functions of a UE 115. The functions performed by a processor 840 may also improve functions in a grant-based and grant-free uplink transmission scheduling and allocation FIG. 9 shows a block diagram 900 of a device 905 that supports temporary PAI for uplink transmissions in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to temporary PAI for uplink transmissions, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may identify that one or more first UEs have been allocated resources via a grant for autonomous uplink transmissions to the base station. In some cases, the base station communications manager 915 may schedule an uplink transmission of a second UE to the base station, where the scheduled uplink transmission of the second UE at least partially overlaps the allocated resources provided to the first UEs. Accordingly, the base station communications manager 915 may transmit to the one or more first UEs a transmit PAI that the one or more first UEs are to adjust a transmit power of uplink transmissions on the allocated resources for a specified time duration. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
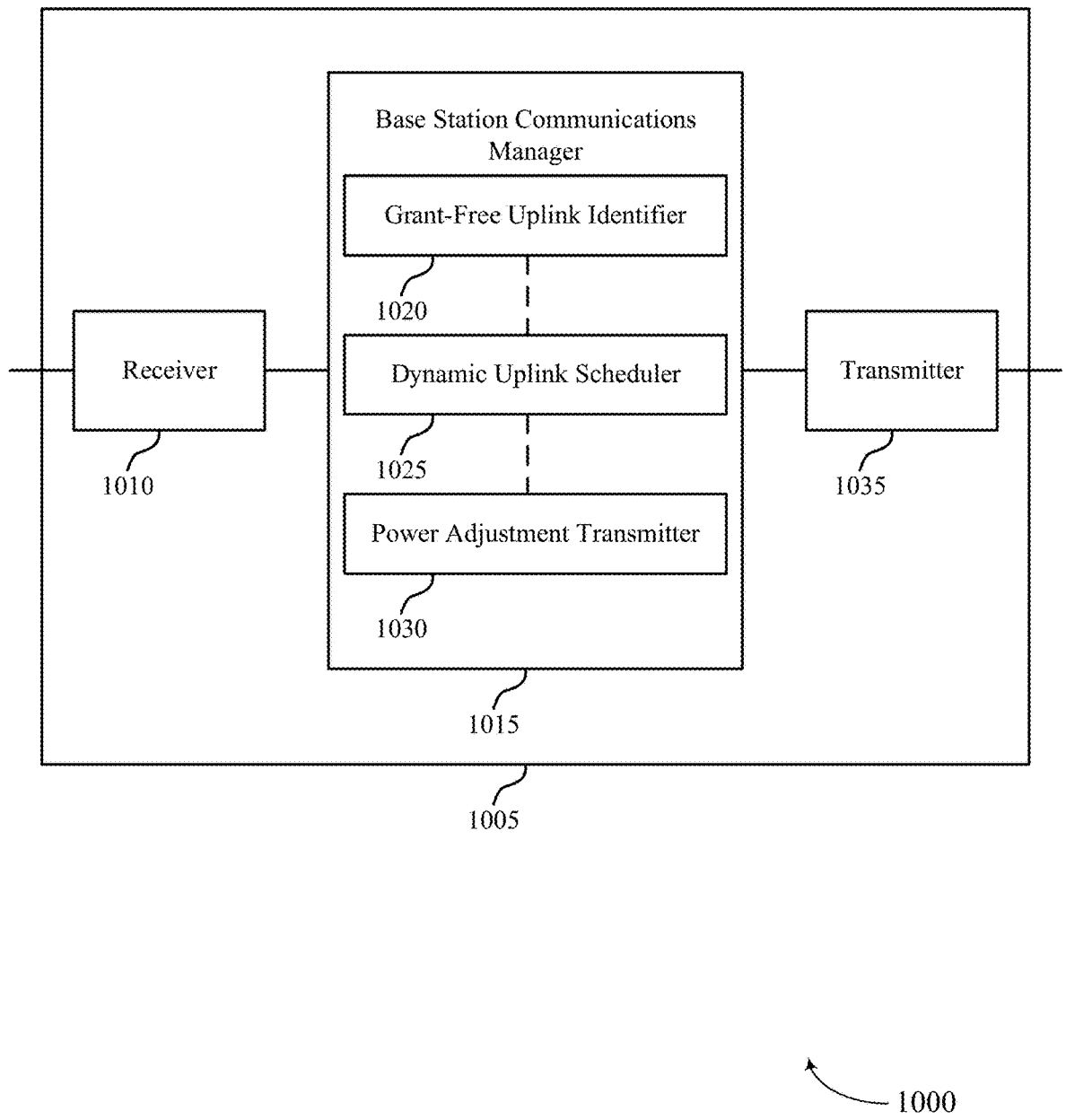

FIG. 10 shows a block diagram 1000 of a device 1005 that supports temporary PAI for uplink transmissions in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to temporary PAI for uplink transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a grant-free uplink identifier 1020, a dynamic uplink scheduler 1025, and a power adjustment transmitter 1030. The base station communications manager 1015 may be an example of aspects of the base station communications manager 1210 described herein.

The grant-free uplink identifier 1020 may identify that one or more first UEs have been allocated resources via a grant for autonomous uplink transmissions to the base station.

The dynamic uplink scheduler 1025 may schedule an uplink transmission of a second UE to the base station, where the scheduled uplink transmission of the second UE at least partially overlaps the allocated resources provided to the first UEs.

The power adjustment transmitter 1030 may transmit to the one or more first UEs a transmit PAI that the one or more first UEs are to adjust a transmit power of uplink transmissions on the allocated resources for a specified time duration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
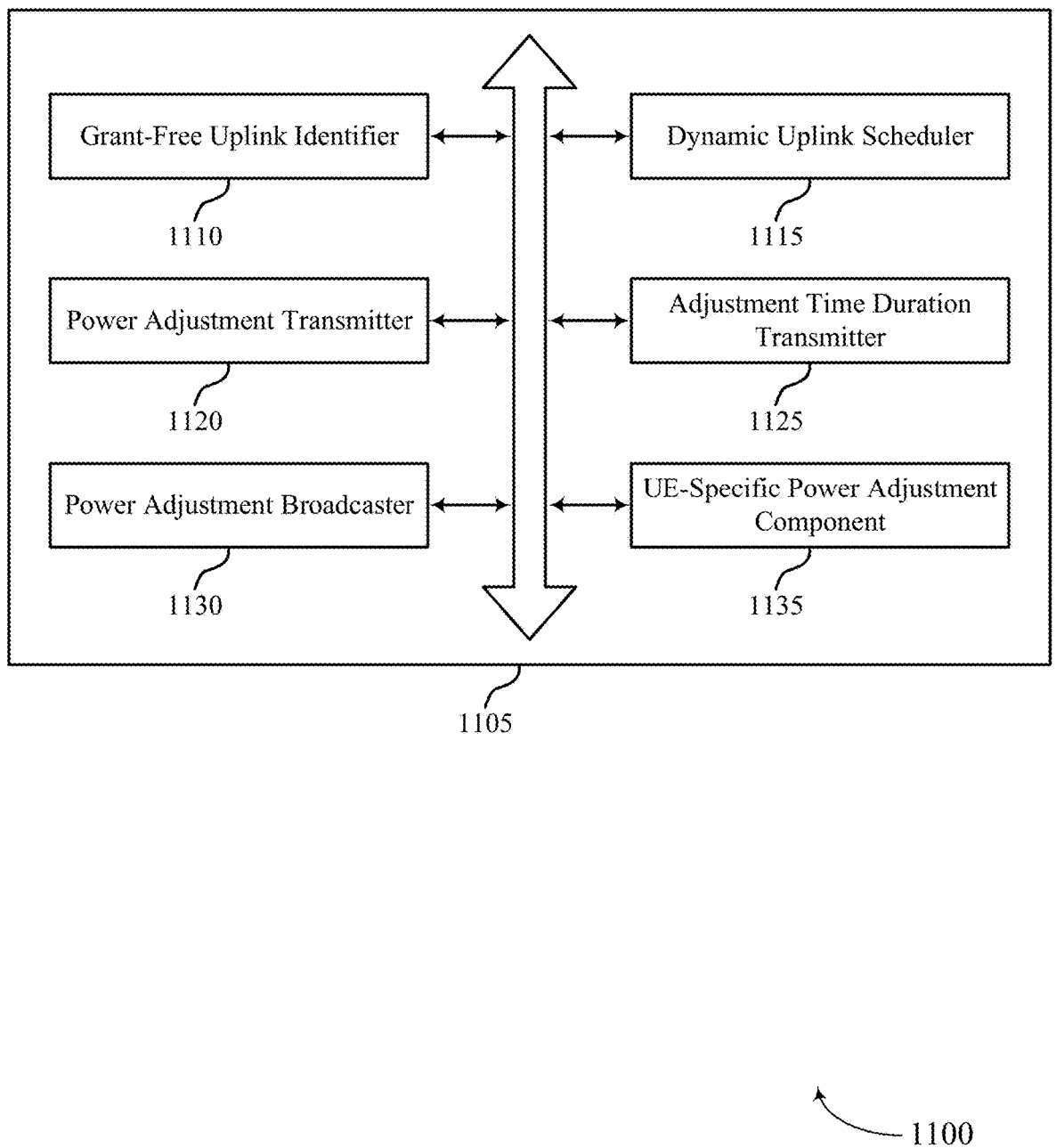
FIG. 11 shows a block diagram of a base station communications manager that supports temporary PAI for uplink transmissions in accordance with aspects of the present disclosure.

FIG. 11 shows a block diagram 1100 of a base station communications manager 1105 that supports temporary PAI for uplink transmissions in accordance with aspects of the present disclosure. The base station communications manager 1105 may be an example of aspects of a base station communications manager 915, a base station communications manager 1015, or a base station communications manager 1210 described herein. The base station communications manager 1105 may include a grant-free uplink identifier 1110, a dynamic uplink scheduler 1115, a power adjustment transmitter 1120, an adjustment time duration transmitter 1125, a power adjustment broadcaster 1130, and an UE-specific power adjustment component 1135. Each of these modules may communicate, directly or indirectly, with one another (e.g., via one or more buses).

The grant-free uplink identifier 1110 may identify that one or more first UEs have been allocated resources via a grant for autonomous uplink transmissions to the base station.

The dynamic uplink scheduler 1115 may schedule an uplink transmission of a second UE to the base station, where the scheduled uplink transmission of the second UE at least partially overlaps the allocated resources provided to the first UEs.

The power adjustment transmitter 1120 may transmit to the one or more first UEs a transmit PAI that the one or more first UEs are to adjust a transmit power of uplink transmissions on the allocated resources for a specified time duration. In some examples, the power adjustment transmitter 1120 may transmit, with the transmit PAI, an indication of frequency-domain resources to which the transmit power adjustment is to be applied, an indication of the specified time duration during which the transmit power adjustment is to be applied, an indication of specific uplink transmissions to which the transmit power adjustment is to be applied, or a combination thereof. In some examples, the power adjustment transmitter 1120 may include the transmit PAI in a dynamic downlink control information message. In some cases, the transmit PAI may include a number of decibels by which the first UEs are to increase the transmit power of uplink transmissions on the allocated resources. Additionally or alternatively, the transmit PAI may include a number of decibels by which the first UEs are to decrease the transmit power of uplink transmissions on the allocated resources.

The adjustment time duration transmitter 1125 may transmit the specified time duration via a configuration message separate from transmission of the transmit PAI. In some cases, the transmit PAI may be to be applied by the first UEs during a particular slot identified to the first UEs. In some cases, the transmit PAI may be to be applied by the first UEs during a same slot in which the first UEs receive the transmit PAI.

The power adjustment broadcaster 1130 may broadcast the transmit PAI. In some examples, the power adjustment broadcaster 1130 may include in the broadcast an indication of at least one of time or frequency resources to which the transmit power adjustment is to be applied.

The UE-specific power adjustment component 1135 may multicast the transmit PAI to at least some of the first UEs via a downlink control information message, where the downlink control information message includes one or more UE-specific fields that each include a UE-specific transmit PAI. Additionally or alternatively, the UE-specific power adjustment component 1135 may configure the at least some of the first UEs with a field index of the respective UE-specific fields in the downlink control information message and a payload size or length of the downlink control information message.

In some examples, the UE-specific power adjustment component 1135 may transmit the downlink control information message using a same periodicity as that of the allocated resources. Additionally or alternatively, the UE-specific power adjustment component 1135 may transmit the downlink control information message using a slot-based periodicity. In some cases, at least one UE-specific transmit PAI may indicate that transmit power is not to be adjusted. In some cases, the specified time duration may be either one slot or one period of the allocated resources.

Figure 12:
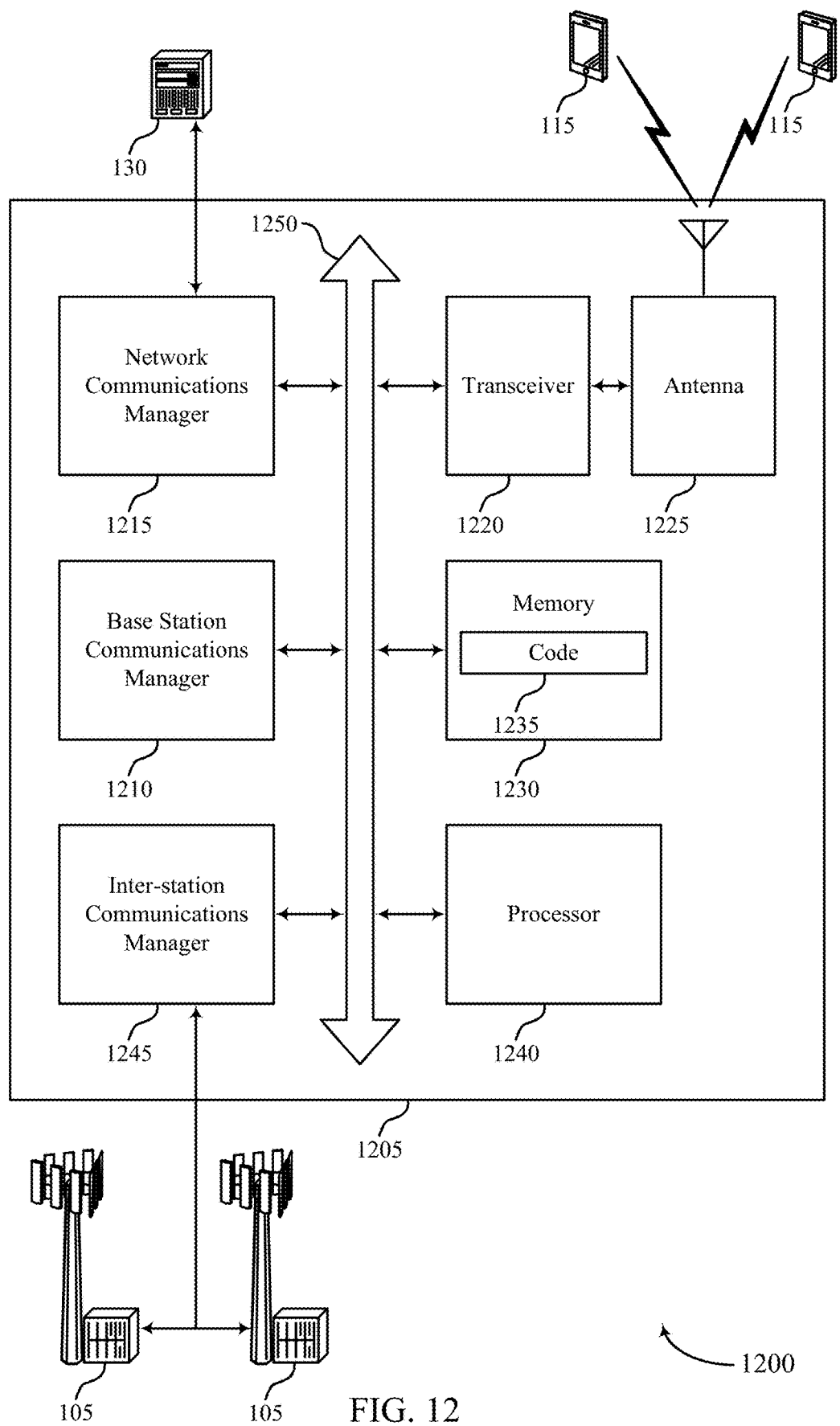
FIG. 12 shows a diagram of a system including a device that supports temporary PAI for uplink transmissions in accordance with aspects of the present disclosure.

FIG. 12 shows a diagram of a system 1200 including a device 1205 that supports temporary PAI for uplink transmissions in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may identify that one or more first UEs have been allocated resources via a grant for autonomous uplink transmissions to the base station. In some cases, the base station communications manager 1210 may schedule an uplink transmission of a second UE to the base station, where the scheduled uplink transmission of the second UE at least partially overlaps the allocated resources provided to the first UEs. Accordingly, the base station communications manager 1210 may transmit to the one or more first UEs a transmit PAI that the one or more first UEs are to adjust a transmit power of uplink transmissions on the allocated resources for a specified time duration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting temporary PAI for uplink transmissions).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
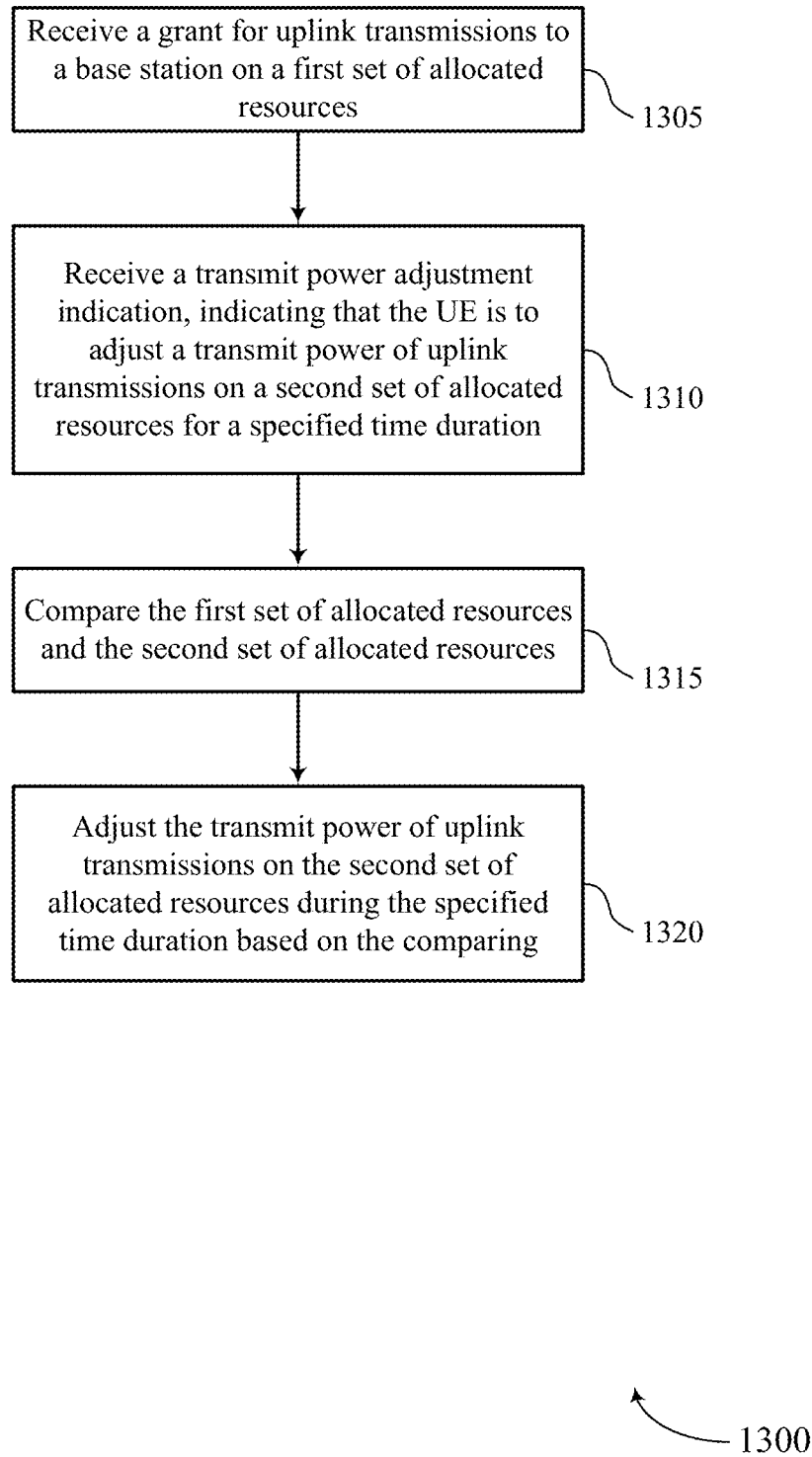
FIGS. 13 through 19 show flowcharts illustrating methods that support temporary PAI for uplink transmissions in accordance with aspects of the present disclosure.

FIG. 13 shows a flowchart illustrating a method 1300 that supports temporary PAI for uplink transmissions in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive a grant for uplink transmissions to a base station on a first set of allocated resources. The operations of 1305 may be performed according to the methods described herein. In some examples, aspects of the operations of 1305 may be performed by a grant-free based uplink component as described with reference to FIGS. 5 through 8.

At 1310, the UE may receive a transmit PAI, indicating that the UE is to adjust a transmit power of uplink transmissions on a second set of allocated resources for a specified time duration. The operations of 1310 may be performed according to the methods described herein. In some examples, aspects of the operations of 1310 may be performed by a power adjustment receiver as described with reference to FIGS. 5 through 8.

At 1315, the UE may compare the first set of allocated resources and the second set of allocated resources. The operations of 1315 may be performed according to the methods described herein. In some examples, aspects of the operations of 1315 may be performed by a power adjuster as described with reference to FIGS. 5 through 8.

At 1320, the UE may adjust the transmit power of uplink transmissions on the second set of allocated resources during the specified time duration based on the comparing. The operations of 1320 may be performed according to the methods described herein. In some examples, aspects of the operations of 1320 may be performed by a power adjuster as described with reference to FIGS. 5 through 8.

Figure 14:
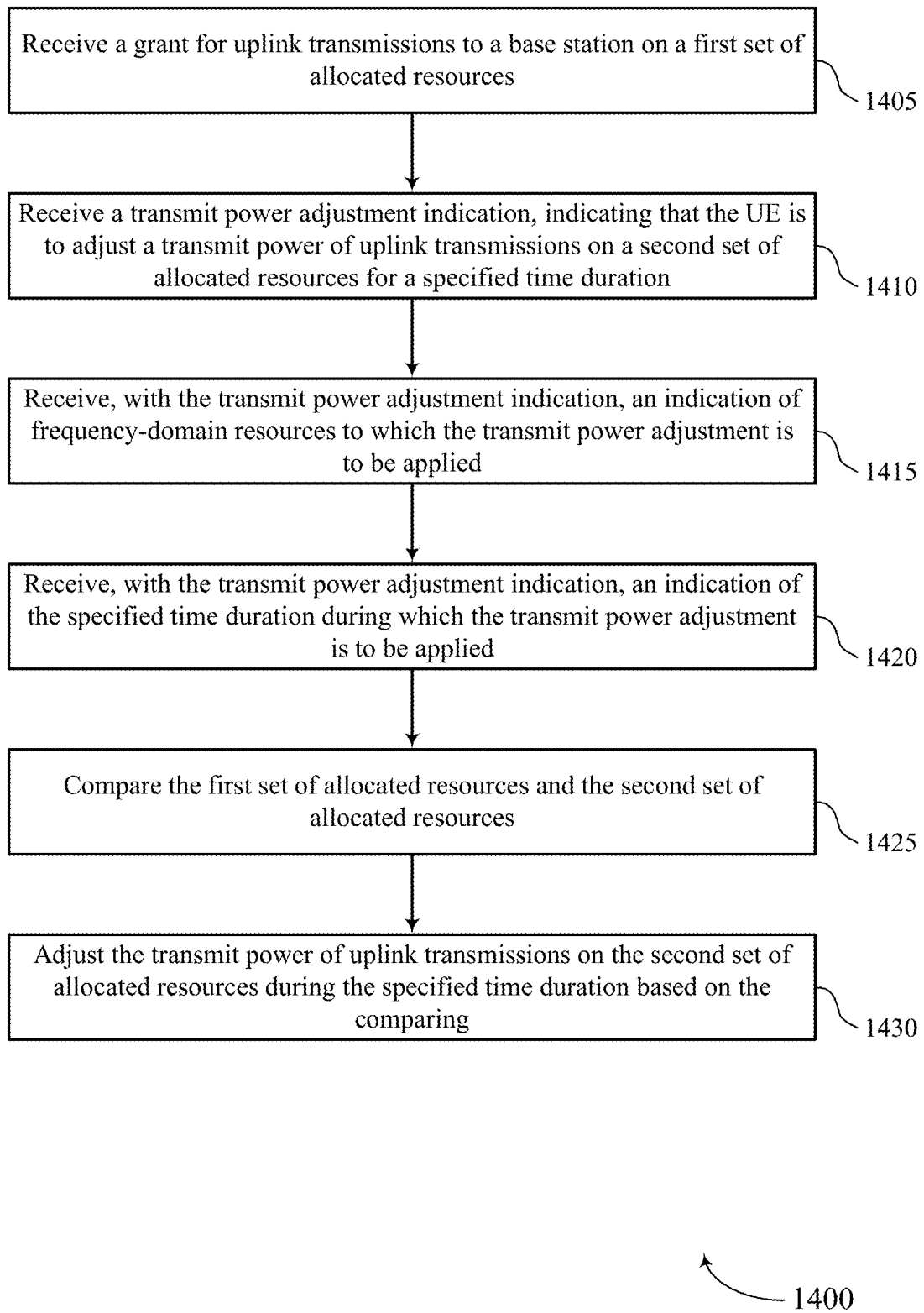

FIG. 14 shows a flowchart illustrating a method 1400 that supports temporary PAI for uplink transmissions in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive a grant for uplink transmissions to a base station on a first set of allocated resources. The operations of 1405 may be performed according to the methods described herein. In some examples, aspects of the operations of 1405 may be performed by a grant-free based uplink component as described with reference to FIGS. 5 through 8.

At 1410, the UE may receive a transmit PAI, indicating that the UE is to adjust a transmit power of uplink transmissions on a second set of allocated resources for a specified time duration. The operations of 1410 may be performed according to the methods described herein. In some examples, aspects of the operations of 1410 may be performed by a power adjustment receiver as described with reference to FIGS. 5 through 8.

At 1415, the UE may receive, with the transmit PAI, an indication of frequency-domain resources to which the transmit power adjustment is to be applied. The operations of 1415 may be performed according to the methods described herein. In some examples, aspects of the operations of 1415 may be performed by a power adjustment receiver as described with reference to FIGS. 5 through 8.

At 1420, the UE may receive, with the transmit PAI, an indication of the specified time duration during which the transmit power adjustment is to be applied. The operations of 1420 may be performed according to the methods described herein. In some examples, aspects of the operations of 1420 may be performed by a power adjustment receiver as described with reference to FIGS. 5 through 8.

At 1425, the UE may compare the first set of allocated resources and the second set of allocated resources. The operations of 1425 may be performed according to the methods described herein. In some examples, aspects of the operations of 1425 may be performed by a power adjuster as described with reference to FIGS. 5 through 8.

At 1430, the UE may adjust the transmit power of uplink transmissions on the second set of allocated resources during the specified time duration based on the comparing. The operations of 1430 may be performed according to the methods described herein. In some examples, aspects of the operations of 1430 may be performed by a power adjuster as described with reference to FIGS. 5 through 8.

Figure 15:
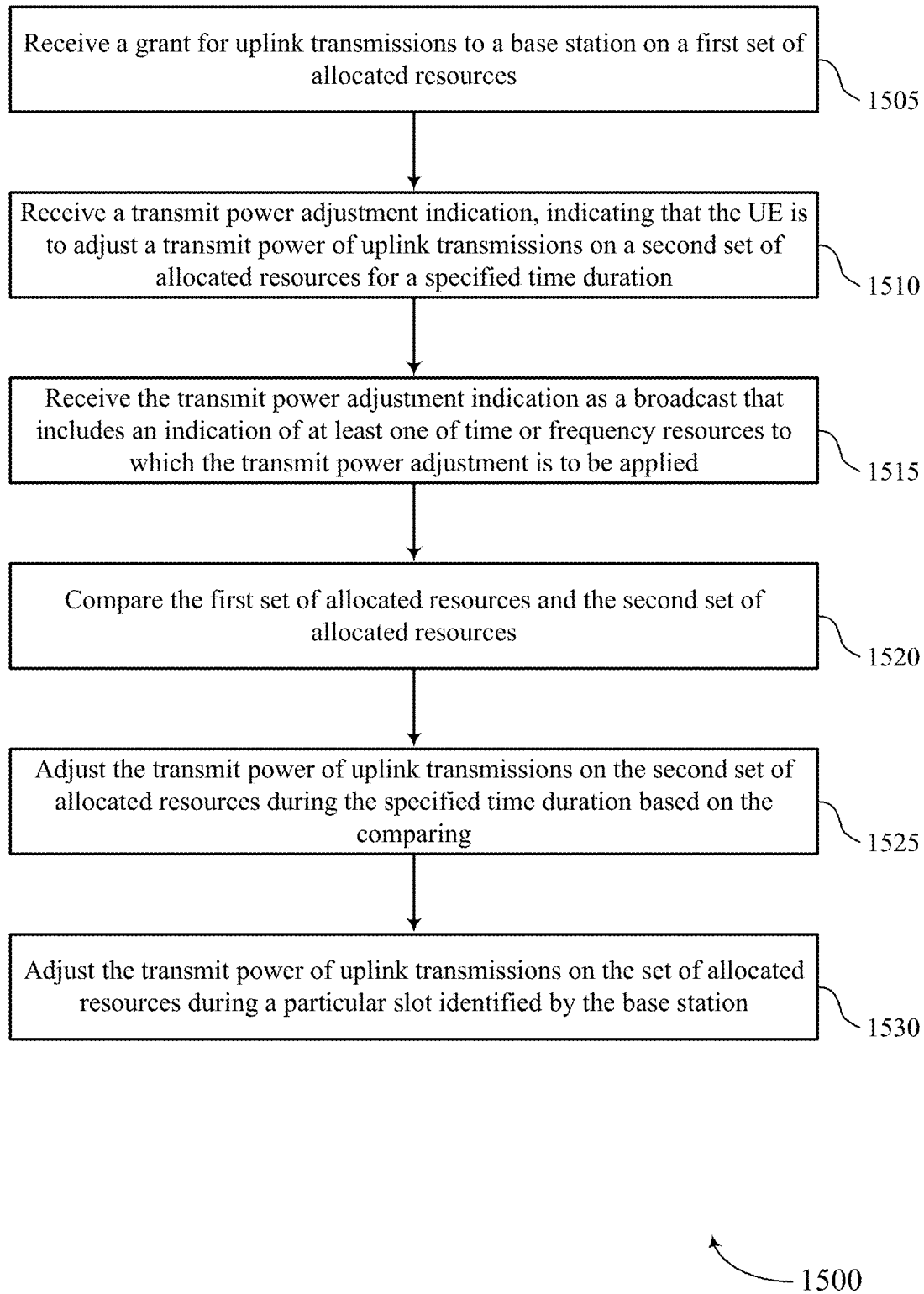

FIG. 15 shows a flowchart illustrating a method 1500 that supports temporary PAI for uplink transmissions in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive a grant for uplink transmissions to a base station on a first set of allocated resources. The operations of 1505 may be performed according to the methods described herein. In some examples, aspects of the operations of 1505 may be performed by a grant-free based uplink component as described with reference to FIGS. 5 through 8.

At 1510, the UE may receive a transmit PAI, indicating that the UE is to adjust a transmit power of uplink transmissions on a second set of allocated resources for a specified time duration. The operations of 1510 may be performed according to the methods described herein. In some examples, aspects of the operations of 1510 may be performed by a power adjustment receiver as described with reference to FIGS. 5 through 8.

At 1515, the UE may receive the transmit PAI as a broadcast that includes an indication of at least one of time or frequency resources to which the transmit power adjustment is to be applied. The operations of 1515 may be performed according to the methods described herein. In some examples, aspects of the operations of 1515 may be performed by a power adjustment broadcast receiver as described with reference to FIGS. 5 through 8.

At 1520, the UE may compare the first set of allocated resources and the second set of allocated resources. The operations of 1520 may be performed according to the methods described herein. In some examples, aspects of the operations of 1520 may be performed by a power adjuster as described with reference to FIGS. 5 through 8.

At 1530, the UE may adjust the transmit power of uplink transmissions on the set of allocated resources during a particular slot identified by the base station. The operations of 1530 may be performed according to the methods described herein. In some examples, aspects of the operations of 1530 may be performed by an adjustment time duration component as described with reference to FIGS. 5 through 8.

Figure 16:
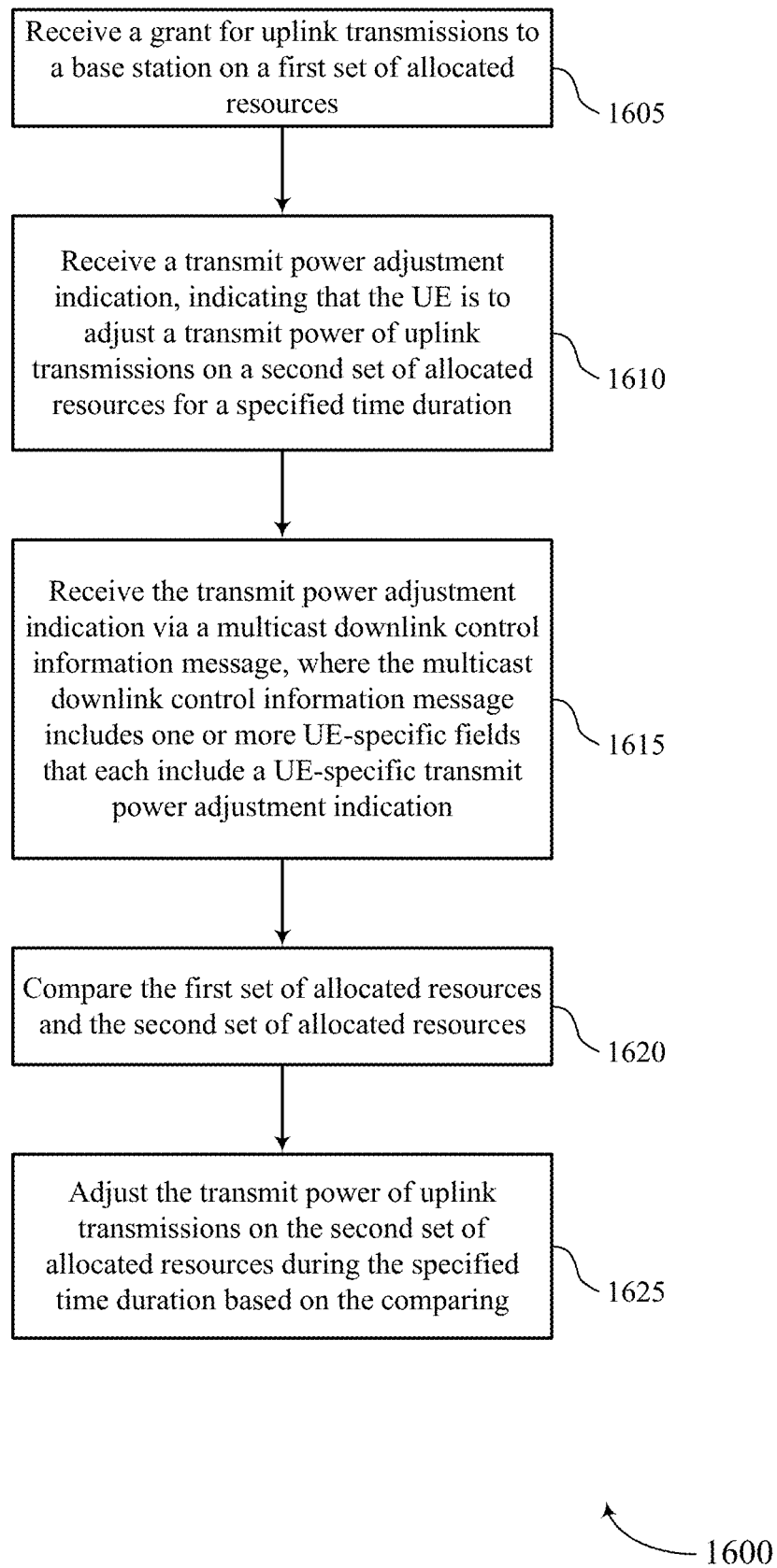

FIG. 16 shows a flowchart illustrating a method 1600 that supports temporary PAI for uplink transmissions in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive a grant for uplink transmissions to a base station on a first set of allocated resources. The operations of 1605 may be performed according to the methods described herein. In some examples, aspects of the operations of 1605 may be performed by a grant-free based uplink component as described with reference to FIGS. 5 through 8.

At 1610, the UE may receive a transmit PAI, indicating that the UE is to adjust a transmit power of uplink transmissions on a second set of allocated resources for a specified time duration. The operations of 1610 may be performed according to the methods described herein. In some examples, aspects of the operations of 1610 may be performed by a power adjustment receiver as described with reference to FIGS. 5 through 8.

At 1615, the UE may receive the transmit PAI via a multicast downlink control information message, where the multicast downlink control information message includes one or more UE-specific fields that each include a UE-specific transmit PAI. The operations of 1615 may be performed according to the methods described herein. In some examples, aspects of the operations of 1615 may be performed by a power adjustment multicast receiver as described with reference to FIGS. 5 through 8.

At 1620, the UE may compare the first set of allocated resources and the second set of allocated resources. The operations of 1620 may be performed according to the methods described herein. In some examples, aspects of the operations of 1620 may be performed by a power adjuster as described with reference to FIGS. 5 through 8.

At 1625, the UE may adjust the transmit power of uplink transmissions on the second set of allocated resources during the specified time duration based on the comparing. The operations of 1625 may be performed according to the methods described herein. In some examples, aspects of the operations of 1625 may be performed by a power adjuster as described with reference to FIGS. 5 through 8.

Figure 17:
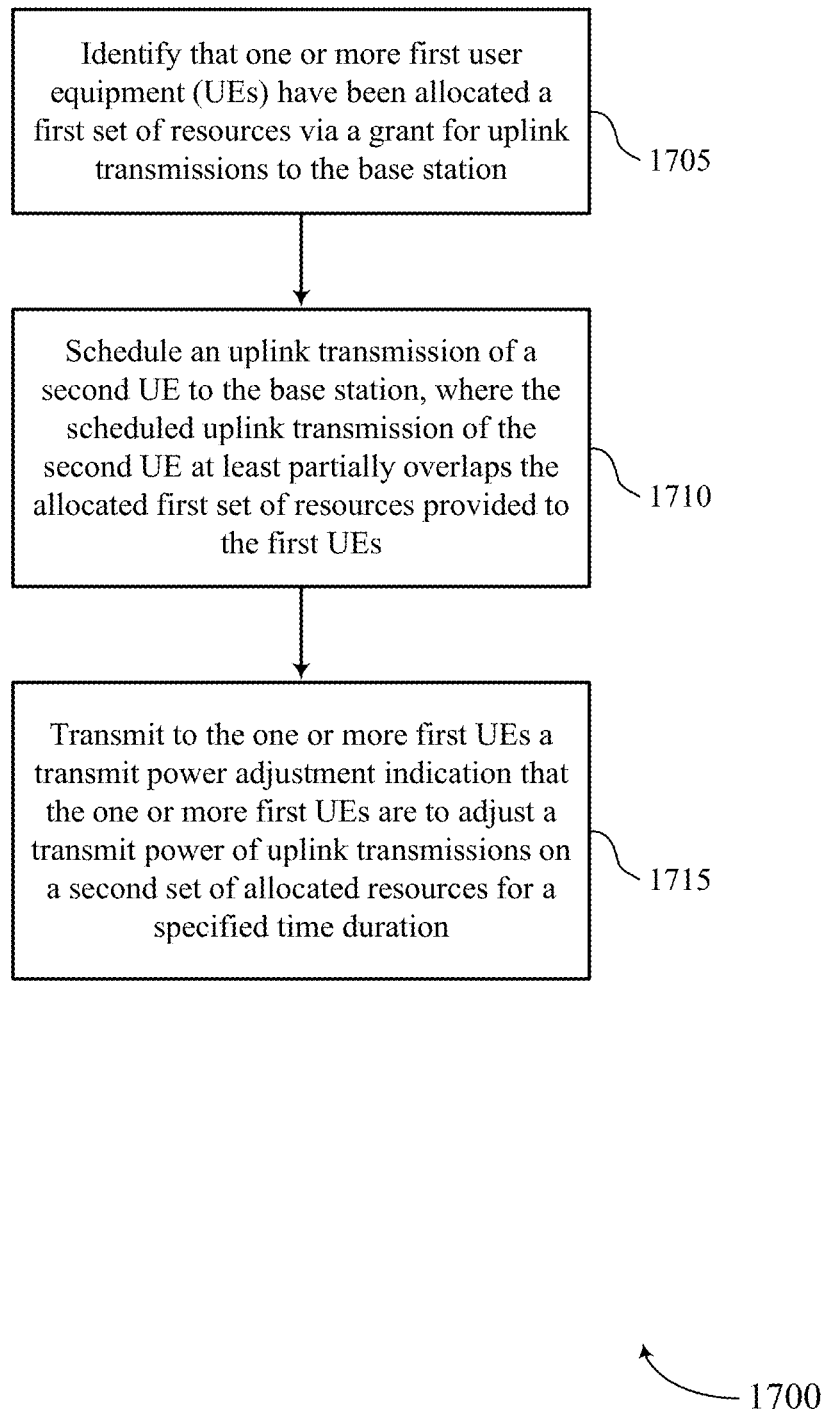

FIG. 17 shows a flowchart illustrating a method 1700 that supports temporary PAI for uplink transmissions in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may identify that one or more first UEs have been allocated a first set of resources via a grant for autonomous uplink transmissions to the base station. The operations of 1705 may be performed according to the methods described herein. In some examples, aspects of the operations of 1705 may be performed by a grant-free uplink identifier as described with reference to FIGS. 9 through 12.

At 1710, the base station may schedule an uplink transmission of a second UE to the base station, where the scheduled uplink transmission of the second UE at least partially overlaps the allocated first set of resources provided to the first UEs. The operations of 1710 may be performed according to the methods described herein. In some examples, aspects of the operations of 1710 may be performed by a dynamic uplink scheduler as described with reference to FIGS. 9 through 12.

At 1715, the base station may transmit to the one or more first UEs a transmit PAI that the one or more first UEs are to adjust a transmit power of uplink transmissions on a second set of allocated resources for a specified time duration. The operations of 1715 may be performed according to the methods described herein. In some examples, aspects of the operations of 1715 may be performed by a power adjustment transmitter as described with reference to FIGS. 9 through 12.

Figure 18:
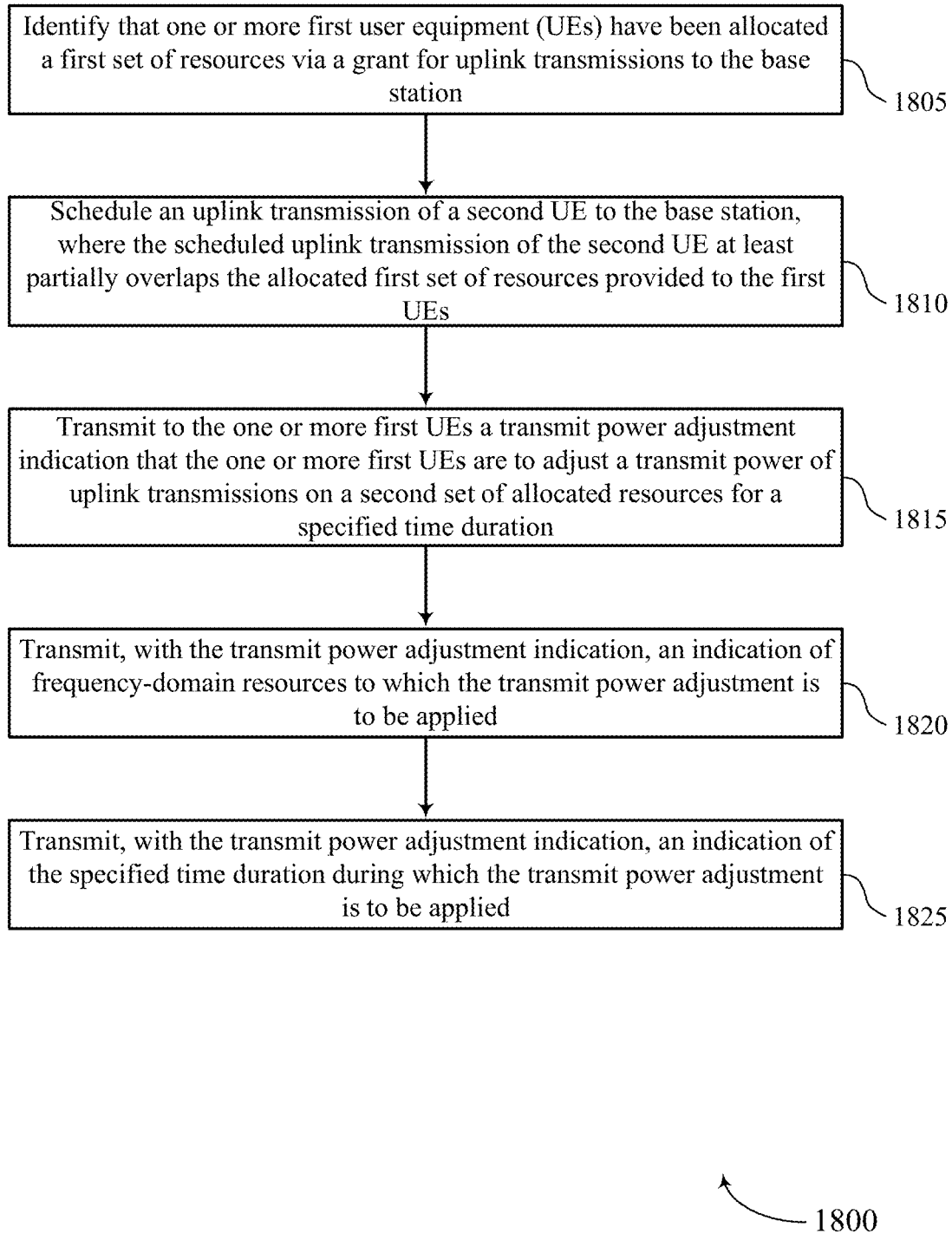

FIG. 18 shows a flowchart illustrating a method 1800 that supports temporary PAI for uplink transmissions in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may identify that one or more first UEs have been allocated a first set of resources via a grant for autonomous uplink transmissions to the base station. The operations of 1805 may be performed according to the methods described herein. In some examples, aspects of the operations of 1805 may be performed by a grant-free uplink identifier as described with reference to FIGS. 9 through 12.

At 1810, the base station may schedule an uplink transmission of a second UE to the base station, where the scheduled uplink transmission of the second UE at least partially overlaps the allocated first set of resources provided to the first UEs. The operations of 1810 may be performed according to the methods described herein. In some examples, aspects of the operations of 1810 may be performed by a dynamic uplink scheduler as described with reference to FIGS. 9 through 12.

At 1815, the base station may transmit to the one or more first UEs a transmit PAI that the one or more first UEs are to adjust a transmit power of uplink transmissions on a second set of allocated resources for a specified time duration. The operations of 1815 may be performed according to the methods described herein. In some examples, aspects of the operations of 1815 may be performed by a power adjustment transmitter as described with reference to FIGS. 9 through 12.

At 1820, the base station may transmit, with the transmit PAI, an indication of frequency-domain resources to which the transmit power adjustment is to be applied. The operations of 1820 may be performed according to the methods described herein. In some examples, aspects of the operations of 1820 may be performed by a power adjustment transmitter as described with reference to FIGS. 9 through 12.

At 1825, the base station may transmit, with the transmit PAI, an indication of the specified time duration during which the transmit power adjustment is to be applied. The operations of 1825 may be performed according to the methods described herein. In some examples, aspects of the operations of 1825 may be performed by a power adjustment transmitter as described with reference to FIGS. 9 through 12.

Figure 19:
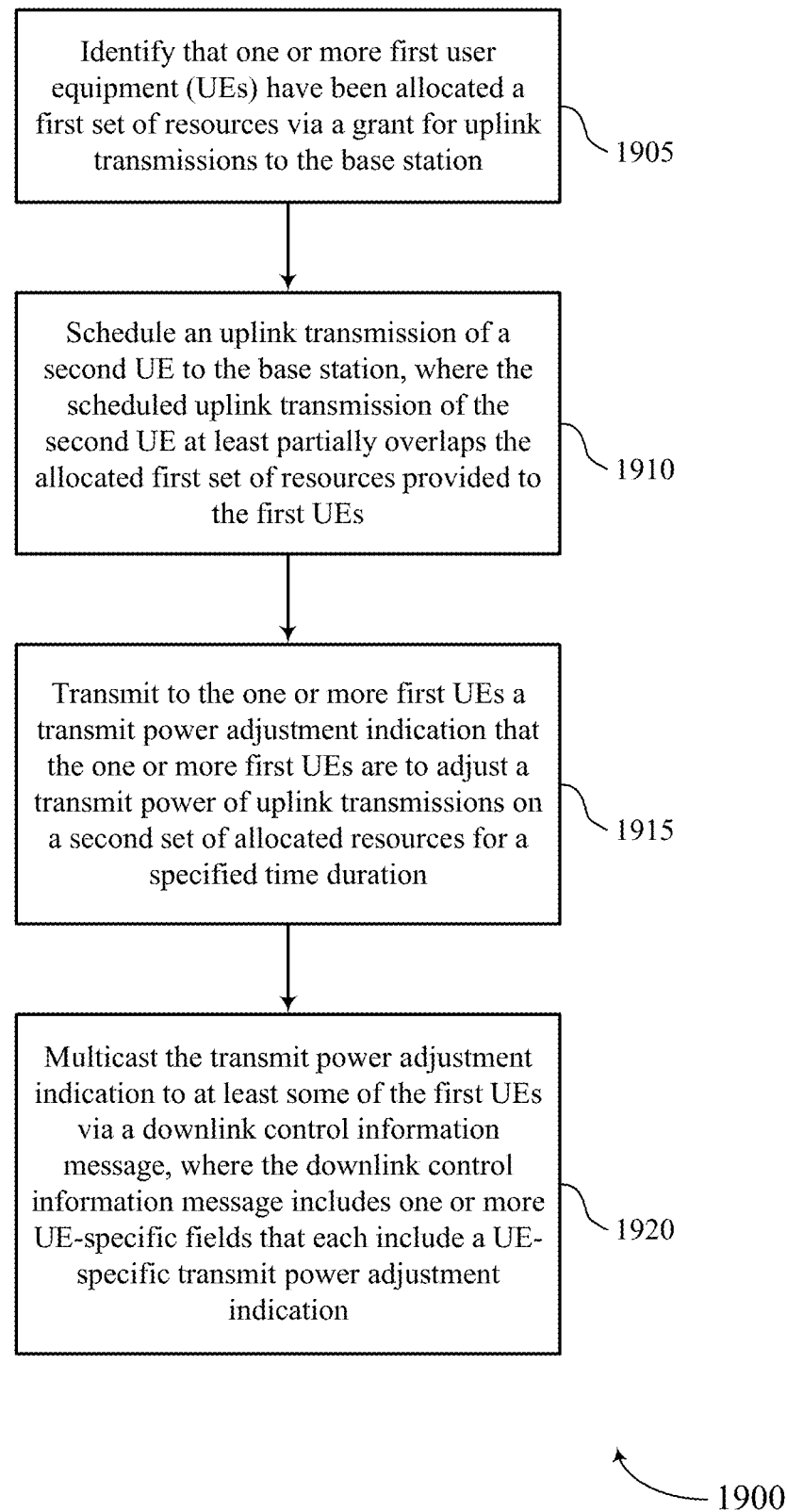

FIG. 19 shows a flowchart illustrating a method 1900 that supports temporary PAI for uplink transmissions in accordance with aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1905, the base station may identify that one or more first UEs have been allocated a first set of resources via a grant for autonomous uplink transmissions to the base station. The operations of 1905 may be performed according to the methods described herein. In some examples, aspects of the operations of 1905 may be performed by a grant-free uplink identifier as described with reference to FIGS. 9 through 12.

At 1910, the base station may schedule an uplink transmission of a second UE to the base station, where the scheduled uplink transmission of the second UE at least partially overlaps the allocated first set of resources provided to the first UEs. The operations of 1910 may be performed according to the methods described herein. In some examples, aspects of the operations of 1910 may be performed by a dynamic uplink scheduler as described with reference to FIGS. 9 through 12.

At 1915, the base station may transmit to the one or more first UEs a transmit PAI that the one or more first UEs are to adjust a transmit power of uplink transmissions on a second set of allocated resources for a specified time duration. The operations of 1915 may be performed according to the methods described herein. In some examples, aspects of the operations of 1915 may be performed by a power adjustment transmitter as described with reference to FIGS. 9 through 12.

At 1920, the base station may multicast the transmit PAI to at least some of the first UEs via a downlink control information message, where the downlink control information message includes one or more UE-specific fields that each include a UE-specific transmit PAI. The operations of 1920 may be performed according to the methods described herein. In some examples, aspects of the operations of 1920 may be performed by an UE-specific power adjustment component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a grant for uplink transmissions to a base station on a first set of allocated resources;
   receiving a transmit power adjustment indication, indicating that the UE is to adjust a transmit power of uplink transmissions on a second set of allocated resources for a specified time duration, wherein the transmit power adjustment indication applies to the second set of allocated resources;
   comparing the first set of allocated resources and the second set of allocated resources; and
   adjusting the transmit power of uplink transmissions on the second set of allocated resources during the specified time duration based at least in part on the comparing.

2. The method of claim 1, further comprising:
   receiving, with the transmit power adjustment indication, an indication of frequency-domain resources to which the transmit power adjustment is to be applied.

3. The method of claim 1, wherein receiving the transmit power adjustment indication comprises:
   receiving the transmit power adjustment indication via a broadcast downlink control message that includes an indication of at least one of time or frequency resources to which the transmit power adjustment is to be applied.

4. The method of claim 3, further comprising:
   comparing the at least one of time or frequency resources to which the transmit power adjustment is to be applied with the set of allocated resources, wherein the uplink transmission whose transmit powers are to be adjusted in accordance with the transmit power adjustment indication are the uplink transmission within the set of allocated resources that overlap with the at least one of time or frequency resources to which the transmit power adjustment is to be applied.

5. The method of claim 1, wherein receiving the grant further comprises:
   receiving the grant for autonomous uplink transmissions to the base station on the first set of allocated resources.

6. The method of claim 1, further comprising:
   receiving, with the transmit power adjustment indication, an indication of the specified time duration during which the transmit power adjustment is to be applied.

7. The method of claim 1, further comprising:
   determining the specified time duration based on a configuration previously received at the UE.

8. The method of claim 1, further comprising:
   receiving, with the transmit power adjustment indication, an indication of specific uplink transmissions to which the transmit power adjustment is to be applied.

9. The method of claim 1, wherein receiving the transmit power adjustment indication comprises:
   receiving the transmit power adjustment indication in a dynamic downlink control information message.

10. The method of claim 1, wherein adjusting the transmit power of uplink transmissions on the set of allocated resources comprises:
    increasing the transmit power of uplink transmissions on the set of allocated resources by a number of decibels specified by the transmit power adjustment indication.

11. The method of claim 1, wherein adjusting the transmit power of uplink transmissions on the set of allocated resources comprises:
    decreasing the transmit power of uplink transmissions on the set of allocated resources by a number of decibels specified by the transmit power adjustment indication.

12. The method of claim 1, wherein adjusting the transmit power of uplink transmissions on the set of allocated resources comprises:
    adjusting the transmit power of uplink transmissions on the set of allocated resources during a particular slot identified by the base station.

13. The method of claim 12, further comprising:
    receiving an indication of the particular slot with receipt of the transmit power adjustment indication.

14. The method of claim 12, further comprising:
    receiving an indication of the particular slot via a configuration message received before receipt of the transmit power adjustment indication.

15. The method of claim 1, wherein adjusting the transmit power of uplink transmissions on the set of allocated resources comprises:
    adjusting the transmit power of uplink transmissions on the set of allocated resources during a same slot in which the UE received the transmit power adjustment indication.

16. The method of claim 1, further comprising:
    receiving a configuration that indicates resources that the UE is to monitor for receipt of the transmit power adjustment indication; and
    monitoring the resources for a signal that includes the transmit power adjustment indication.

17. The method of claim 1, wherein receiving the transmit power adjustment indication comprises:
    receiving the transmit power adjustment indication via a multicast downlink control information message, wherein the multicast downlink control information message includes one or more UE-specific fields that each include a UE-specific transmit power adjustment indication.

18. The method of claim 17, wherein the UE-specific transmit power adjustment indication indicates that transmit power of the UE is not to be adjusted.

19. The method of claim 17, further comprising:
    receiving a configuration indicating a field index of the UE-specific field in the multicast downlink control information message that pertains to the UE and a payload size or length of the multicast downlink control information message.

20. The method of claim 17, wherein receiving the transmit power adjustment indication via the multicast downlink control information message comprises:

receiving the multicast downlink control information message via a same periodicity as that of the set of allocated resources for the uplink transmissions.

21. The method of claim 17, wherein receiving the transmit power adjustment indication via the multicast downlink control information message comprises:

receiving the multicast downlink control information message via a slot-based periodicity.

22. The method of claim 17, wherein the specified time duration is either one slot or one period of the set of allocated resources.

23. An apparatus for wireless communication at a user equipment (UE), comprising:

a processor, memory coupled with the processor; and instructions stored in the memory and executable by the processor to cause the apparatus to:

receive a grant for uplink transmissions to a base station on a first set of allocated resources;

receive a transmit power adjustment indication, indicating that the UE is to adjust a transmit power of uplink transmissions on a second set of allocated resources for a specified time duration, wherein the transmit power adjustment indication applies to the second set of allocated resources;

compare the first set of allocated resources and the second set of allocated resources; and adjust the transmit power of uplink transmissions on the second set of allocated resources during the specified time duration based at least in part on the comparison of the first set of allocated resources and the second set of allocated resources.

* * * * *